(12) United States Patent
White

(10) Patent No.: US 9,033,178 B2
(45) Date of Patent: May 19, 2015

(54) STORING, TRANSPORTING AND HANDLING COMPRESSED FLUIDS

(75) Inventor: Charles N. White, Houston, TX (US)

(73) Assignee: EnerSea Transport LLC, Houston, TX (US)

( * ) Notice: Subject to any disclaimer, the term of this patent is extended or adjusted under 35 U.S.C. 154(b) by 1074 days.

(21) Appl. No.: 12/074,183

(22) Filed: Feb. 29, 2008

(65) Prior Publication Data

US 2008/0209918 A1    Sep. 4, 2008

Related U.S. Application Data

(60) Provisional application No. 60/904,541, filed on Mar. 2, 2007, provisional application No. 60/926,504, filed on Apr. 27, 2007.

(51) Int. Cl.
*F17C 1/02* (2006.01)
*F17C 5/06* (2006.01)
(Continued)

(52) U.S. Cl.
CPC ... *F17C 5/06* (2013.01); *F17C 5/02* (2013.01); *F17C 7/00* (2013.01); *F17C 7/02* (2013.01); *F17C 13/025* (2013.01); *F17C 13/026* (2013.01); *F17C 2201/0104* (2013.01); *F17C 2201/032* (2013.01); *F17C 2201/052* (2013.01); *F17C 2201/054* (2013.01); *F17C 2205/0111* (2013.01); *F17C 2205/013* (2013.01); *F17C 2205/0142* (2013.01); *F17C 2205/0146* (2013.01); *F17C 2205/0176* (2013.01); *F17C 2221/011* (2013.01); *F17C 2221/012* (2013.01); *F17C 2221/014* (2013.01); *F17C 2221/031* (2013.01); *F17C 2221/033* (2013.01);
(Continued)

(58) Field of Classification Search
USPC .......... 220/1.6, 577, 560.04, 560.12, 560.11, 220/560.08, 560.05, 560.07; 62/50.1
See application file for complete search history.

(56) References Cited

U.S. PATENT DOCUMENTS 3,150,794 A    9/1964    Schlumberger et al.
3,179,323 A    4/1965    Miller
(Continued)

FOREIGN PATENT DOCUMENTS

| CA | 2532748 A1 | 7/2006 |
|---|---|---|
| WO | 0036333 A1 | 12/1998 |
| WO | 0220352 A1 | 3/2002 |

OTHER PUBLICATIONS 28-page International Search Report and Written Opinion for corresponding International Application No. PCT/US2008/002750 submitted herewith, which includes all or portions of the above-noted patent documents.

*Primary Examiner* — Jeffrey Allen
(74) *Attorney, Agent, or Firm* — Stephen S. Hodgson

(57) ABSTRACT

A container has a pair of opposing heads, and a wall section between the heads has a square cross-section and planar side walls joined together by rounded corners. The side walls tend to deflect outwardly while under pressure, but are supported externally by a support system such as the walls of a cargo hold. Another container comprises an outside tank and a flexible membrane tank inside the outside tank, an annular space being defined in between, where a first fluid is charged into the membrane tank and a second fluid is charged into the annular space in order to discharge the first fluid. In another embodiment, a long tube having a square cross-section is coiled in a support structure and made gas-tight for holding a compressed fluid, and adjacent coils and the support structure limit expansion of the tube.

43 Claims, 9 Drawing Sheets

(51) Int. Cl.
  *F17C 5/02* (2006.01)
  *F17C 7/00* (2006.01)
  *F17C 7/02* (2006.01)
  *F17C 13/02* (2006.01)

(52) U.S. Cl.
  CPC ... *F17C2221/035* (2013.01); *F17C 2223/0115* (2013.01); *F17C 2223/0123* (2013.01); *F17C 2223/0153* (2013.01); *F17C 2223/033* (2013.01); *F17C 2223/043* (2013.01); *F17C 2223/046* (2013.01); *F17C 2225/0115* (2013.01); *F17C 2225/0123* (2013.01); *F17C 2225/0153* (2013.01); *F17C 2225/033* (2013.01); *F17C 2225/035* (2013.01); *F17C 2225/046* (2013.01); *F17C 2227/0157* (2013.01); *F17C 2227/0192* (2013.01); *F17C 2227/0337* (2013.01); *F17C 2227/0339* (2013.01); *F17C 2227/0341* (2013.01); *F17C 2227/0372* (2013.01); *F17C 2227/0388* (2013.01); *F17C 2227/043* (2013.01); *F17C 2227/048* (2013.01); *F17C 2250/0626* (2013.01); *F17C 2250/0631* (2013.01); *F17C 2265/022* (2013.01); *F17C 2270/01* (2013.01); *F17C 2270/0105* (2013.01); *F17C 2270/0134* (2013.01); *Y02E 60/321* (2013.01)

(56) References Cited

U.S. PATENT DOCUMENTS

| | | | |
|---|---|---|---|
| 3,232,725 | A | 2/1966 | Second et al. |
| 3,293,011 | A | 12/1966 | Lewis et al. |
| 3,298,805 | A | 1/1967 | Secord et al. |
| 3,314,567 | A | 4/1967 | Becker et al. |
| 3,332,386 | A | 7/1967 | Massac |
| 3,420,396 | A * | 1/1969 | Bridges et al. ......... 220/560.05 |
| 3,428,205 | A * | 2/1969 | Basile et al. ......... 220/560.07 |
| 3,446,385 | A | 5/1969 | Ponemon |
| 3,613,932 | A | 10/1971 | Yamamoto |
| 3,622,030 | A | 11/1971 | Yamamoto |
| 3,780,900 | A | 12/1973 | Yamamoto |
| 3,820,492 | A | 6/1974 | Yamamoto |
| 3,828,608 | A | 8/1974 | Yamamoto |
| 3,831,811 | A | 8/1974 | Becker |
| 3,904,067 | A | 9/1975 | Kuniyasu |
| 4,089,468 | A | 5/1978 | Alonso |
| 4,119,241 | A | 10/1978 | Furuta |
| 4,139,019 | A | 2/1979 | Bresie et al. |
| 4,183,221 | A | 1/1980 | Yamamoto |
| 4,213,476 | A | 7/1980 | Bresie et al. |
| 4,459,929 | A | 7/1984 | Ffooks |
| 4,846,088 | A | 7/1989 | Fanse et al. |
| 5,253,682 | A | 10/1993 | Haskett et al. |
| 5,429,268 | A | 7/1995 | Hale |
| 5,577,630 | A | 11/1996 | Blair et al. |
| 5,603,360 | A | 2/1997 | Teel |
| 5,695,839 | A | 12/1997 | Yamada et al. |
| 5,727,492 | A | 3/1998 | Cuneo et al. |
| 5,839,383 | A | 11/1998 | Stenning et al. |
| 6,012,598 | A * | 1/2000 | Antoniou ......... 220/1.5 |
| 6,047,747 | A | 4/2000 | Bowen et al. |
| 6,085,528 | A | 7/2000 | Woodall et al. |
| 6,240,868 | B1 | 6/2001 | Fitzpatrick et al. |
| 6,339,996 | B1 | 1/2002 | Campbell |
| 6,460,721 | B2 | 10/2002 | Minta et al. |
| 6,584,781 | B2 | 7/2003 | Bishop et al. |
| 6,779,565 | B1 | 8/2004 | Fawley |
| 6,863,474 | B2 | 3/2005 | Webster et al. |
| 6,994,104 | B2 | 2/2006 | Bishop et al. |
| 7,137,260 | B2 | 11/2006 | Perry |
| 7,147,124 | B2 | 12/2006 | Minta et al. |
| 7,155,918 | B1 | 1/2007 | Shivers, III |
| 7,159,432 | B2 | 1/2007 | Schule |
| 7,213,970 | B1 | 5/2007 | Reicin et al. |
| 7,257,952 | B2 | 8/2007 | Bishop et al. |
| 7,517,391 | B2 | 4/2009 | Hall et al. |

* cited by examiner

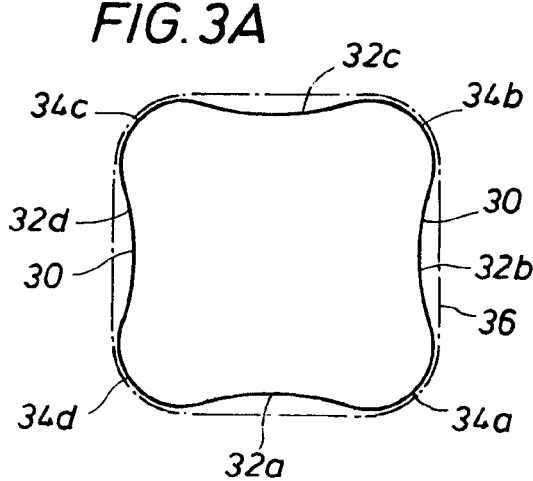
FIG. 3A
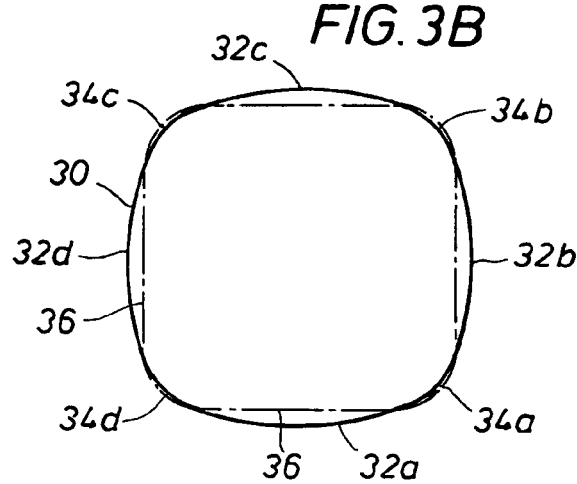
FIG. 3B
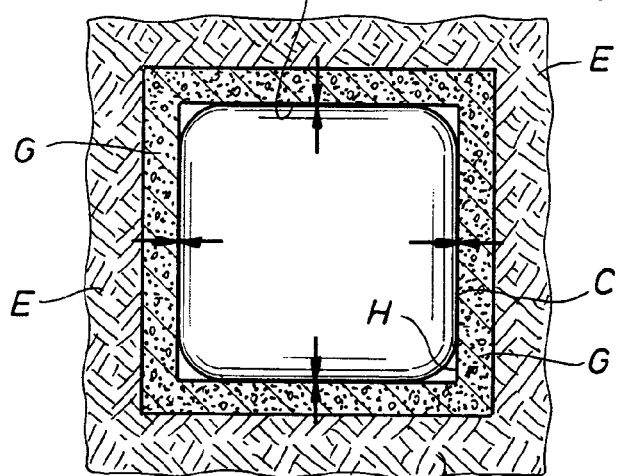
FIG. 3C
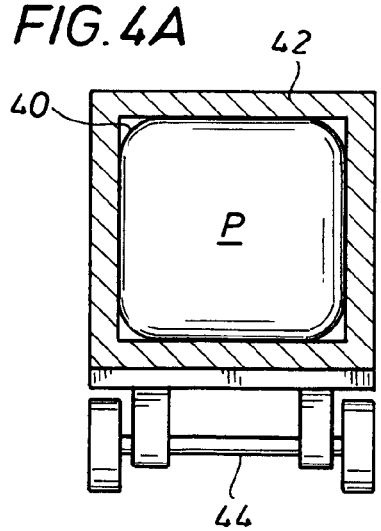
FIG. 4A
FIG. 4B

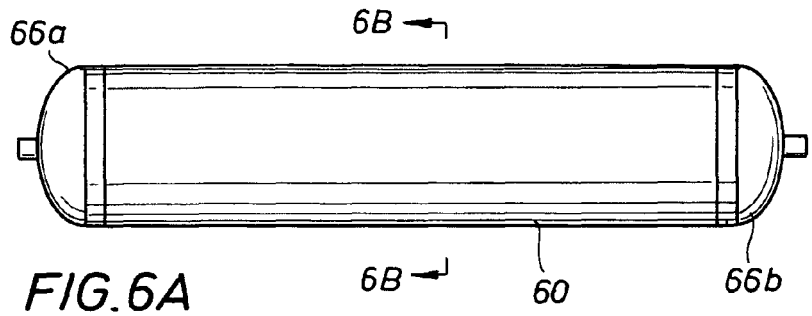
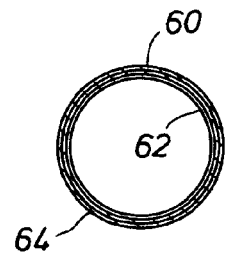
FIG.6A  FIG.6B
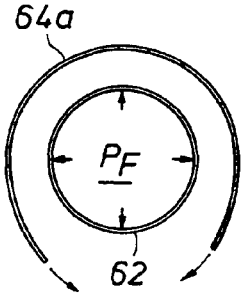 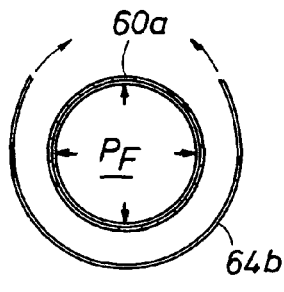 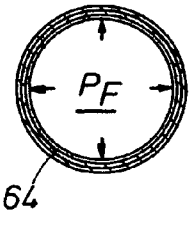
FIG.6C   FIG.6D   FIG.6E   FIG.6F
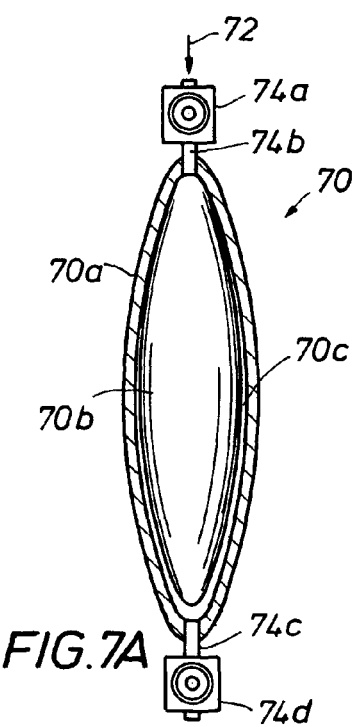 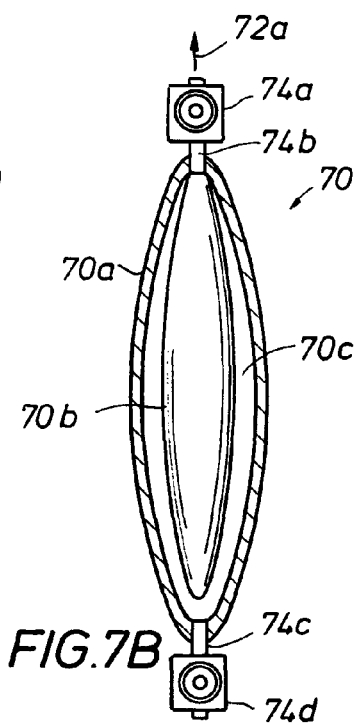 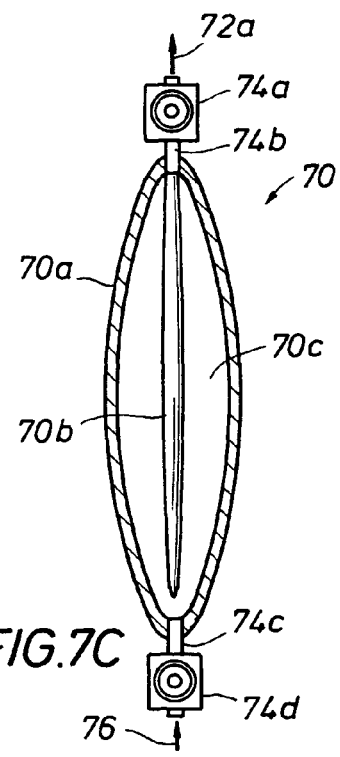
FIG.7A   FIG.7B   FIG.7C

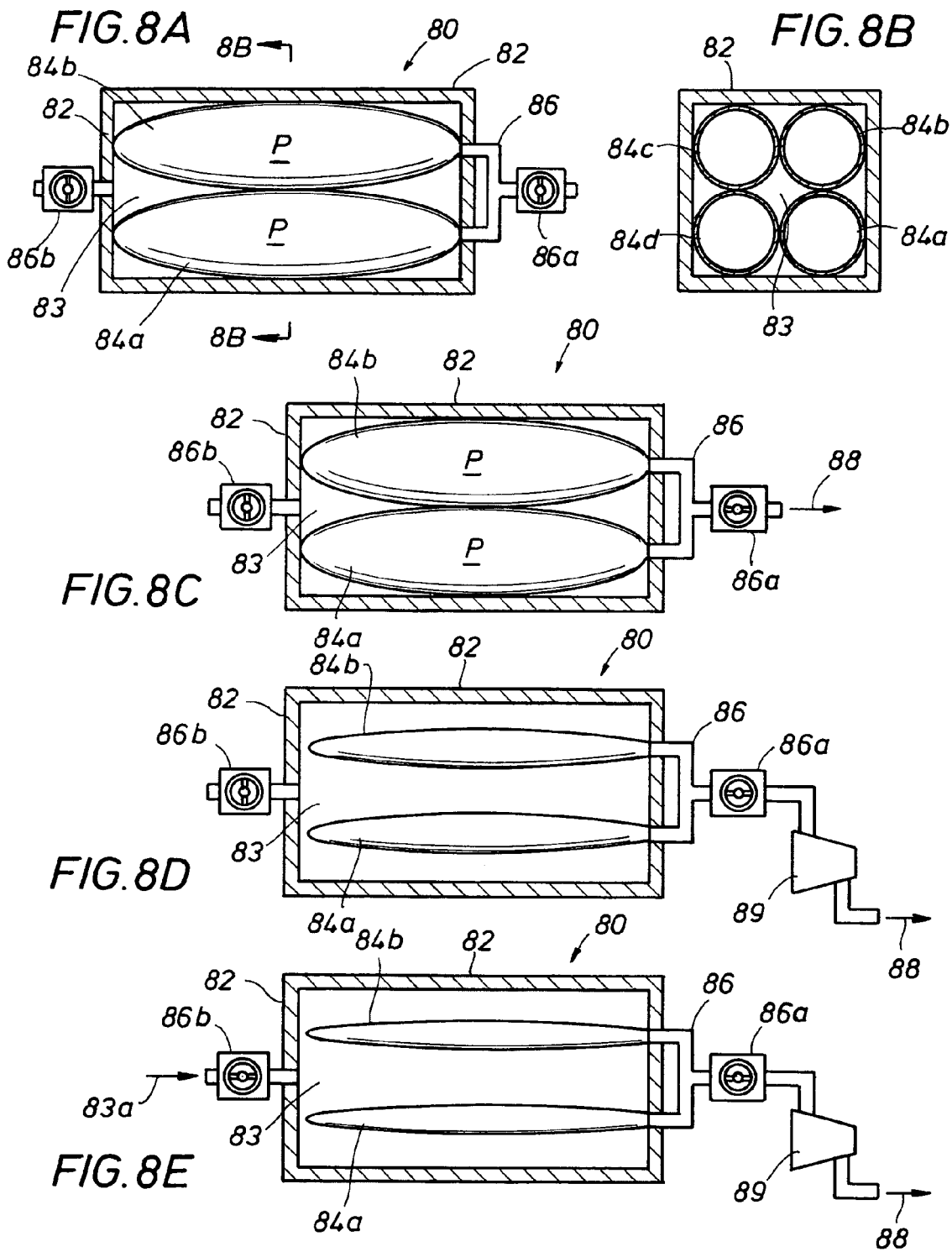

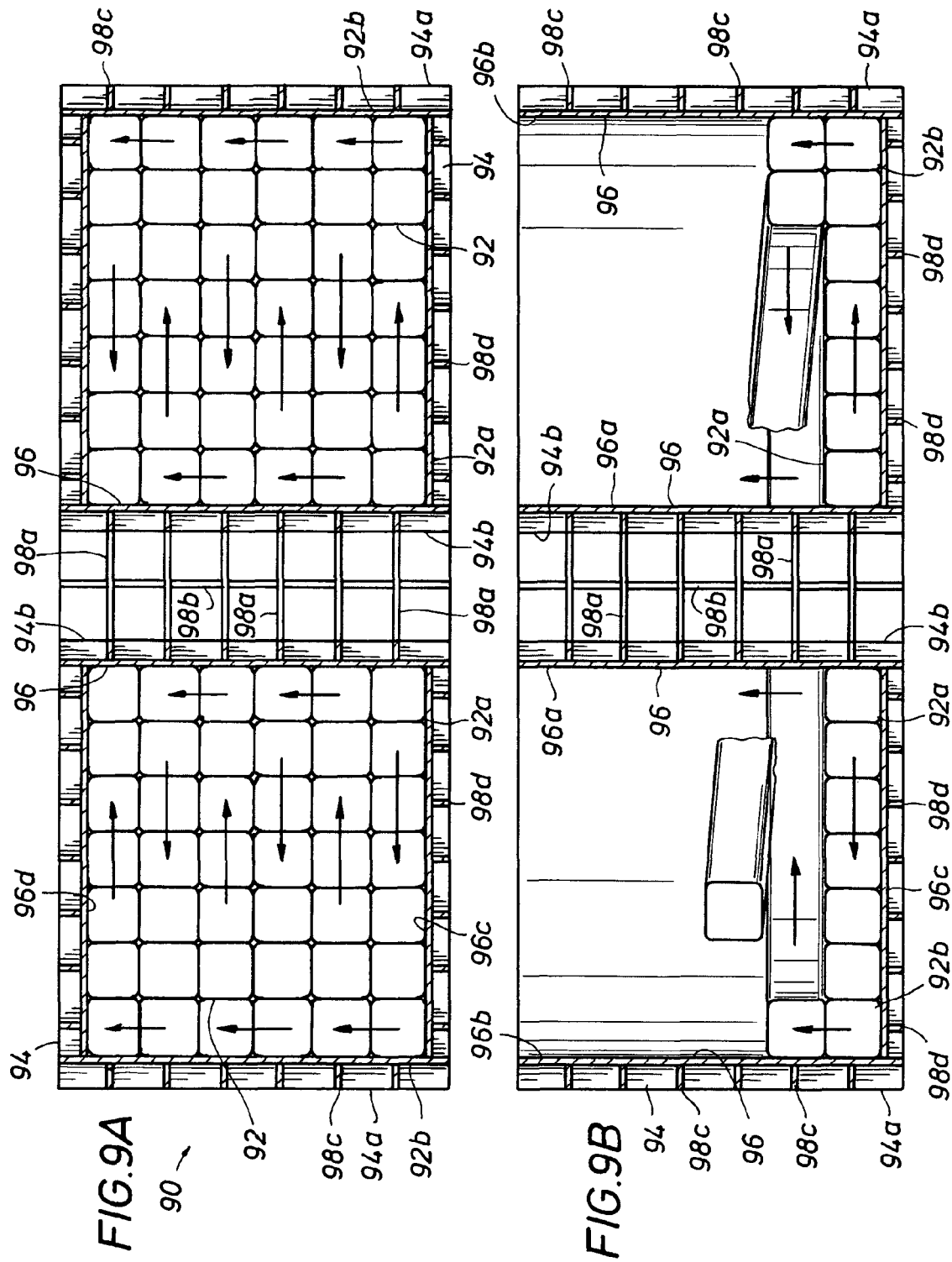

STORING, TRANSPORTING AND HANDLING COMPRESSED FLUIDS

CROSS REFERENCE TO RELATED APPLICATION

Priority is claimed to U.S. Provisional Patent Application Ser. Nos. 60/904,541 and 60/926,504, each of which was filed by the present inventor on Mar. 2, 2007, and Apr. 27, 2007, respectively, and each is incorporated by reference. A U.S. patent application filed by the present inventor on a date concurrent herewith, which claims priority to the same provisional patent applications, entitled "Apparatus and Method for Flowing Compressed Fluids Into and Out of Containment" is related hereto and incorporated by reference.

BACKGROUND OF THE INVENTION

1. Field of the Invention

This present invention pertains to the storage and transport of gas and liquids, and more particularly to storage and/or transport of refrigerated and pressurized fluid cargos (e.g., natural gas and natural gas liquids) in relatively thin-walled containers at low temperatures where commercial cargo densities can be achieved at moderate pressures and where the containers efficiently fill available storage and/or transport space.

2. Description of the Related Art

Gases are presently stored in relatively long cylinders, bullet tanks, oblate spheroids or spheres that all feature at least one circular cross-section cut and have relatively high wall thickness to diameter ratios (t/D) to resist pressure-induced hoop stresses because the materials used to fabricate these essentially rigid containers are of limited effective strength in the orientation of the critical stresses (regardless whether metallic or fiber-based matrix shells or hybrid composites thereof). The general structure of these containers is a rigid form having a circular cross-section.

The most common form of large-scale, pressurized gas containment for storage or transport purposes is based on the use of single wall metallic cylinders or bottles, which are often made of high-strength steels that may possibly contain moderate proportions of alloying elements, such as nickel, that provide a low-temperature-toughness characteristic. It is possible that the cylindrical shape will be of an extreme length-to-diameter ratio, taking the form of a pipeline whether straight or looped or coiled. See U.S. Pat. Nos. 5,803,005; 5,839,383 and 6,003,460, issued to Stenning et al. and U.S. Patent Application Pub. No. 20040216656 filed by Fitzpatrick et al. and assigned Ser. No. 10/472,615, each of which is incorporated by reference and collectively referred to as "the Stenning patents." Sea NG Management Corp. of Calgary, Canada provides compressed gas storage and transportation services via coiled pipe under the trademark "Coselle," which is understood to be based on the technology described in the Stenning patent documents. However, steel cylinders/pipeline gas storage containers discussed in prior art are relatively heavy as compared to the weight of the gas cargo contained. When the gas is to be transported (e.g., by truck, rail, barge, or ship), it is important to optimize the weight of the gas cargo to the weight of the containment because high containment weight generally means higher costs and limitations on how many containers can be placed in or on conveyances of limited load capacity (e.g., trucks on highways).

Some inventors have sought to improve the ratio of presurized cargo mass to container mass by using such low temperatures that cargo can be liquefied at relatively moderate pressures. See, for example, U.S. Patent Application Pub. No. 20030183638, filed by Minta et al. and assigned Ser. No. 10/396,895 and U.S. Pat. No. 6,047,747, issued to Bowen et al.; U.S. Pat. No. 6,085,528, issued to Woodall; U.S. Pat. No. 6,460,721, issued to Bowen et al.; and U.S. Pat. No. 7,147,124, issued to Minta et al., each of which is assigned to ExxonMobil Upstream Research Co. of Houston, Tex. (collectively referred to as "the ExxonMobil patents"). See also U.S. Pat. Nos. 6,932,121; 6,964,180; and 7,155,918, each of which is issued to Shivers, III and assigned to ATP Oil & Gas Corp. of Houston, Tex. Each of the following patents and patent applications are incorporated by reference: U.S. Pat. No. 6,584,781, issued to Bishop et al., U.S. Pat. No. 6,655,155, issued to Bishop, and U.S. Pat. No. 6,725,671, issued to Bishop, and U.S. Patent Application Pub. Nos. 20020046547, filed by Bishop et al. and assigned Ser. No. 09/943,693 and 20030106324, filed by Bishop et al. and assigned Ser. No. 10/316,475, each of which is believed to be assigned to Enersea Transport, LLC of Houston, Tex., and are collectively referred to as "the Bishop patents" or "Bishop." The Bishop patents consider that the mass ratio for circular cylinders can be commercially optimized by selecting storage pressures that minimize the compressibility factor Z for temperatures below about −10° C. while keeping the cargo stored as a dense phase fluid. U.S. Pat. Nos. 3,232,725 and 3,298,805 are incorporated by reference, each of which issued to Secord et al. and are collectively referred to as "the Secord patents" or "Secord." Secord suggests an approach that can achieve very high mass ratios by allowing a mixed phase fluid to exist in the cargo containers by selecting temperature-pressure combinations that keep the cargo fluid state very close to the phase boundary for temperatures ranging from just below the critical temperature of methane to a minimum of about −200° F. (−129° C.). However, all of the above reference the application of their design principles to tanks of circular cross-sections to manage hoop-like stresses induced in the skins of their essentially rigid containers by the internal pressure of the cargos they store and/or carry.

U.S. Pat. No. 6,863,474, issued to Webster et al., describes using the external pressure supplied by the hydraulic head acting on a storage container placed deep beneath the surface of the sea to counter any internal pressure associated with storing natural gas as a means to reduce the required thickness of the shell of a cylindrical container. However, such a container is still expected to be an essentially rigid cylinder and the premise is little different than just laying a long loop of a large diameter pipeline deep undersea for storage.

Some have sought to reduce the weight of natural gas cargo containment cylinders (particularly, highly pressurized gas) by proposing or using concepts for composite wall structures (see American Society of Mechanical Engineers Pressure Vessel Codes and ASME PV Code Case 2390), including the following:

"built-up walls" using multiple layers of circular formed steel plates;

metallic base cylinder wrapped with very high strength metallic wire, wire mesh, or bands;

metallic, metallicized plastic or plastic base cylinder/liner wrapped with fiber-resin straps/bands, mesh, or reinforcement; and metallic, metallicized plastic or plastic base cylinder/liner with a resin-based matrix of randomly-oriented short fibers.

When external materials are laid over metallic base cylinders, auto-frettage (where a permanent pre-stressing of the liner is imposed by pressuring it up against the cured/bonded over-layers until it yields and plastically deforms) may be used to optimize the stress distribution between dissimilar materials under expected loadings. In all cases, the resultant containment cross-section is essentially circular and rigid. Auto-frettage is an engineering standard practice and is clarified within ASME Pressure Vessel Code Sect. VIII Div. 3, KD-5, "Design Using Auto-frettage."

While individual fibers used for reinforcement may be of ultra-high strength glass or carbon fiber materials, compound wall structure is generally fabricated to provide resistance against stress induced by longitudinal and bending loads— not just hoop stress caused by the internal pressure of the stored content.

The composite wall cylinders have proved to be successful strategies for improving the gas/container weight ratio, but they have also proven to be a substantially more costly solution as compared to the simple metal cylindrical bottle (or pipeline) for storage of gas at a given pressure. In the case of simple metal cylindrical tanks, higher strength materials are chosen to limit the weight and cost impact of the containment.

The ExxonMobil patents describe ways to use plates with a strength of about 900 megapascals (900 MPa) based on the chemistry and steel-making processes for the plate material and composite wall construction methods to produce large diameter liquid cargo containers of relatively light weight as compared to previous practice. However, all the containers considered feature circular cross-sections on at least one plane of cut. The composite structures described have circular cross-sections so that fiber winding may be efficiently practiced.

In the Bishop patents, it was determined that the most efficient way to store large volumes of CNG in cylinders is in simple metallic cylinders but at subzero temperatures such that commercially attractive volume compression ratios (ratio of the volume of the cargo fluid at ambient conditions to the volume of stored cargo fluid at storage conditions, ranging from 250-350:1) can be achieved by using approximately half the storage pressure applied in ambient or elevated temperature storage concepts. U.S. Pat. No. 6,725,671, a Bishop patent, and U.S. Pat. No. 7,137,260, issued to Perry and assigned to Zedgas, Inc. of British Columbia, Canada, also recommend the mixing of heavier hydrocarbon gases or carbon dioxide to improve transport efficiency. This approach allows the "storage efficiency" (gas weight/container weight) to be increased dramatically without requiring the complexity and cost of a composite cylinder wall structure. However, Bishop's approach specifies that gas should be stored in a dense phase state to avoid liquid drop out that occurs under two-phase storage conditions. Pressures needed to maintain dense phase fluid storage at the targeted operating temperatures still push toward the use of very many strong, rigid cylinders with relatively thick, heavy walls when considering storage or transport of commercially significant quantities of natural gas. The heavy cylindrical containers are costly to support and transport whether being carried in or on land vehicles or marine vessels.

Except for lined carbon fiber composite tanks, moderate and high pressure gas cargo tanks as currently in practice or as cited in prior art exhibit relatively high self weights that impose practical constraints on the means of transports. Roadway load limits restrict the potential for using large diameter high pressure CNG tanks in land transport, even by rail. Practical ship designs that recognize realistic draft limitations for port entry and dry-docking are limited in how many of the heavy cylindrical cargo containers can be carried onboard.

When the cylinders are relatively short (i.e., with length over diameter ratios <<1000), as opposed to a coiled tubing concept as proposed in the Stenning patents, a very large number of cylinders must be linked with interconnecting piping and valves to create a large volume storage facility. Interconnecting and operating storage with many cylinders involves investment in large quantities of piping, connections, and controls.

Whatever the quantity of rigid cylinders or spheres required in the facility or onboard the means of transport, a substantial amount of space around each cylinder should be provided to allow inspection according to industrial standards. See ABS Guideline for Vessels Intended to Carry Compressed Natural Gases in Bulk, 2005. As a result of allowing standardized clearances around each cylinder in the cargo hold space of a marine vessel, cylinders of 1.0 meter (1 m) diameter would occupy only about 40% of the available footprint when spaced out practically with a vertical orientation. The larger the diameter of the cylinders, the larger the proportion of the available space that can be utilized. For example, a single cylinder of a diameter allowing just the minimum code-required clearance from the surrounding bulkheads could occupy about 70% of a square hold. However, it is unlikely that a single rigid cylinder designed to withstand the high pressures typically proposed in prior art at a diameter that would match the size of the space typically available within the hold of a typical ship could be practically fabricated from the materials and structures proposed by prior art, whether of single or composite skin construction. Therefore, it is expected that projects using cylinders of essentially rigid, circular cross-sections (straight or coiled) are likely to utilize substantially less than 70% of the cargo space available within the means of transport.

Therefore, a need exists for a safe cargo containment solution that allows better utilization of the cargo spaces within or on the means of transport (ship, railcar, or truck trailer) when transporting refrigerated and compressed fluids, especially, natural gas and/or liquefied natural gases of various hydrocarbon compositions.

The term "natural gas" as used in this document refers to light hydrocarbon compositions that are dominated by the methane molecule, but may be comprised of heavier hydrocarbon molecules as well as limited non-hydrocarbon impurities (such as water, carbon dioxide, and nitrogen) in any proportion that would exist as gas vapor at ambient temperature and pressure. This "natural gas" may have originated as a naturally occurring fluid stream extracted from the earth or as synthetically combined mixture of molecules created for the purposes of transport in or on some form of mobile platform (such as a ship, railcar, or truck trailer). "Compressed natural gas" may be referred to simply as "CNG", whether refrigerated or not. "Pressurized liquid natural gas" or "pressurized natural gas liquid", often referred to as "PLNG" herein, is deeply refrigerated, but may not necessarily be stored at temperatures below the critical temperature of methane.

SUMMARY OF THE INVENTION

The present invention provides apparatus and methods for storing and/or transporting fluids. In one embodiment, an apparatus for storage and/or transport of a fluid cargo includes a container adapted to hold the fluid cargo at a specified normal operating pressure that is at least about 0.15 MPa greater than atmospheric pressure. The container has a pair of opposing heads and a wall section between the heads, where the wall section defines a non-circular cross-section. At least two adjacent and substantially planar sides having a wall thickness are joined together by a rounded corner. The container is adapted to allow the sides to deflect outwardly by at least the amount of the wall thickness while the container contains the fluid cargo at the specified normal operating pressure. Preferably, the container is sufficiently rigid to be self supporting when empty. The container is preferably used in conjunction with an external support system that limits the outward deflection of the side walls while under pressure so that the container and the external support system are adapted to hold the fluid cargo under pressure that is at least about 1 MPa greater than atmospheric pressure at a temperature as low as about minus 160° C. In some applications, the specified normal operating pressure may be about 5 or even 10 MPa greater than atmospheric pressure.

Typically, the container has a square cross-section, but the shape can be customized for the application. In this embodiment, each side has a length $L_S$ and each rounded corner has a radius of curvature $R_C$, and preferably the ratio $L_S/R_C$ is between about 2 and about 6, more preferably between about 2.5 and about 5 and most preferably between about 3 and about 4.

The containers are preferably used in a system for storage and/or transport of a compressed gas, where the system includes a plurality of stand-alone containers adapted for holding the compressed gas at a specified operating pressure of at least about 0.25 MPa above atmospheric pressure. Each container has opposing end caps, and a wall section having a non-circular cross-section is disposed between the end caps. The wall section preferably has substantially planar wall panels joined together by rounded corners. Each container is preferably located proximate to at least one other container so that at least a portion of the wall section of each container presses against the wall section of at least one other container while filled with the compressed gas. A structural enclosure surrounds the plurality of stand-alone containers, and the wall section of some portion of the containers press against the structural enclosure. The structural enclosure provides a counterforce to a pressure force inside the containers that would deflect or expand the sides of the containers so that the outward deflection is restricted or limited by the structural enclosure. The structure enclosure is typically provided by a cargo hold in a marine vessel or on a rail car or a cargo box on a truck trailer. It is likely necessary to structurally reinforce the cargo hold to withstand the pressure force exerted by the containers. An ISO container serves well as external structural support for one or more containers, and the ISO container can have a cube shape (typically 8 foot per side) that is useful for forming standard-sized ISO containers of different lengths.

One embodiment of the present invention provides a marine vessel for storing and/or transporting a compressed fluid, which is typically compressed natural gas but can be any other suitable compressed fluid or hydrate. The marine vessel comprises a hull having a bow, a stern and opposing sides connecting the bow to the stern, one or more longitudinal support walls extending between the bow and the stern, and one or more transverse support walls extending between the sides. A plurality of cargo holds is defined by the sides, the one or more longitudinal support walls, and the one or more transverse support walls. At least one container is received in each cargo hold for holding the compressed fluid, where each container has a wall section between a pair of opposing end caps. The wall section of the container is supported externally by the sides, the one or more longitudinal support walls, and/or the one or more transverse support walls to limit outward movement of the wall section of the container. Preferably, two or more containers are received in one cargo hold, and the wall sections of the containers rest against each other for support. The containers, which are preferably square in cross-section and have rounded corners, are thus supported externally by adjacent containers within a cargo hold and/or by the walls that define the cargo hold.

A preferred application for the marine vessel is to transport compressed natural gas, so the containers are preferably adapted to hold compressed natural gas at a temperature as low as about minus 160° C. and at a specified normal operating pressure of at least about 1.50 MPa greater than atmospheric pressure. The gas conditions are preferably those conditions preferred under the Secord patents and/or those conditions preferred under the Bishop patents.

The present invention provides in one embodiment a method for storing and/or transporting a fluid. The method includes providing a support structure, providing a container adapted for holding the fluid, the container having a wall section, the wall section having non-circular cross-section and a wall portion that has an outer surface, and locating the container adjacent to the support structure so that the support structure is adjacent to the outer surface of the wall portion. The wall portion rests against the support structure while the container is filled with the fluid and operating at a pressure of at least about 0.15 MPa above atmospheric pressure, preferably about 0.25, 0.50 or 0.75 MPa gauge, and more preferably at least about 1 MPa gauge. The support structure provides a counter-force to a force caused by the pressure of the fluid acting to expand the wall portion of the wall section of the container. The wall structure is alternatively part of a marine vessel, a railroad car, a cargo box on a truck trailer or a shaft in the earth.

The fluid is preferably compressed natural gas having a temperature between about minus 160° C. and about 30° C. and a pressure greater than about 1 MPa above atmospheric pressure. However, the containers and methods of the present invention can be used for various types of fluids including fluidized materials such as pelletized and fluidized hydrates, particularly natural gas hydrates.

In another embodiment, a method for storing a compressed fluid in the earth is provided, which comprises providing a hole in the earth, the hole being defined by an inside wall, installing a container in the hole, the container being adapted for holding the compressed fluid and having a pair of end caps and a wall section between the end caps. The wall section has a thickness, a non-circular cross-section and an outer surface, where the outer surface of the wall section of the container is adjacent to the inside wall that defines the hole in the earth. The container is filled with the compressed fluid to a specified normal operating pressure that is at least 1 MPa gauge, and the wall section of the container is allowed to expand outwardly at least an amount equal to the thickness of the wall section, preferably 3, 5, 8 or 10 times the thickness, due to the pressure force of the compressed fluid until the wall section expands no further due to forces within the wall section and/or due to a reactive force exerted by the earth.

The present invention also provides a method for making a cylindrical container, which comprising providing a flexible, thin-walled sealing liner having a cylindrical wall, filling the sealing liner with a fluid under sufficient pressure to hold the cylindrical wall in a firm cylindrical shape, wrapping a first sheet of material around the sealing liner, wrapping a second sheet of material around the sealing liner and/or the first sheet of material, bonding the second sheet of material to the first sheet of material and/or to the sealing liner, wrapping a third sheet of material around the sealing liner and/or the first sheet of material and/or the second sheet of material, and bonding the third sheet of material to the first sheet of material and/or to the second sheet of material and/or to the sealing liner.

Thus, the method involves building a wall to a desired thickness around the sealing liner by successively wrapping and bonding sheets of material around the sealing liner to form a cylinder having first and second opposing ends. End caps are provided on the first and second ends to complete the formation of the cylindrical container, which is thus adapted to contain a compressed fluid under a specified normal operating pressure of at least about 0.5 MPa gauge. In a preferred embodiment, the cylindrical container has a rectangular cross-section with rounded corners and preferably a square cross-section.

Another embodiment of the present invention provides a container for storage and/or transport of a compressed fluid. The container includes an outside tank having an inside surface, an inlet and an outlet; and a membrane tank inside the outside tank, the membrane tank having an outside wall, an inlet and an outlet, the membrane being flexible and being adapted to hold the compressed fluid at a specified normal operating pressure of at least about 0.5 MPa above atmospheric pressure while supported by the outside tank. An annular space is defined between the inside surface of the outside tank and the outside wall of the membrane tank, and the outside tank is adapted to receive a second fluid into the annular space for compressing the membrane tank and/or to discharge the compressed fluid from the membrane tank. The outside tank may be, for example, an ISO container, or it may reside in and/or comprise a hole in the earth.

This inventive container is useful in a method in which the compressed fluid is charged into the membrane tank at a first location, which is transported to a second location, where it is discharged by charging the second fluid into the annular space at the second location. This method can be very good for minimizing the heel of compressed fluid remaining in the membrane tank, depending on the pressure of the second fluid and the back pressure, which is from the receiving infrastructure, on the compressed fluid. If the pressure of the second fluid is sufficiently higher than the back pressure, the amount of heel will be low. The method includes transporting the second fluid to the first location, and discharging the second fluid at the first location, where compressed fluid is charged into the membrane tank at the first location for discharging the second fluid. The method preferably includes selling the second fluid at the first location because it has commercial value at the first location. For example, the compressed fluid may be natural gas, and the second fluid may be carbon dioxide. Either of the fluids could be inside the membrane tank as opposed to inside the annular space.

In charging either the membrane tank or the annular space with compressed natural gas, there is a Joules-Thompson effect that cools the gas due to expansion of the gas. The cooling can cause liquid droplets to form and fall out, and it is preferred to maintain the gas in a dense gaseous phase. It is preferred to maintain a desired pressure in the annular space while charging the compressed fluid in the membrane tank so that the temperature of the compressed fluid is maintained within a desired range.

In another embodiment of the present invention, an apparatus for storage and/or transport of a fluid under pressure is provided, which comprises a carousel can having an inside wall and a tube coiled into coiled layers inside the carousel can, where the tube is adapted to hold the fluid under a specified normal operating pressure that is at least about 0.5 MPa higher than atmospheric pressure. The tube has a substantially square cross-section, and the walls of the tube are preferably supported against over expansion by the wall of an adjacent portion of the coiled tube or by the inside wall of the carousel can. Preferably, the walls of the tube are provided with corrugations formed transverse to the longitudinal axis of the tube to facilitate coiling and to give structural stability to the walls. Corrugations would also be useful for a tube having a circular cross-section such as described in the Stenning patents. The carousel can is preferably filled with grout, epoxy, hydrocarbon-based resin, insulating material and/or a fiber-reinforced composite material.

The coiled tubing can be made by providing a coiled reel of sheet metal, forming a tube having a square cross-section by pulling the sheet metal over a mandrel, whereby a longitudinal seam is formed and welding the longitudinal seam. The tube is coiled into adjacent coils to form a first layer, where each subsequent coil lies outside of and adjacent to an immediately preceding coil, coiling the tube into adjacent coils to form a second layer, where each subsequent coil lies inside of and adjacent to an immediately preceding coil, and where the second layer is adjacent to the first layer. Gas-tight valves are provided on the ends of the tube to form a gas-tight container that is adapted to hold a gas under a specified normal operating pressure that is at least about 0.5 MPa gauge.

Preferably, a carousel can is included that has an essentially circular spindle and an essentially circular outer wall, and the coils form a spiraling shape inside the carousel can, which provides external support to restrict expansion of the coils. Alternatively, each coil forms substantially a shape having two parallel lines spaced apart a distance of 2R, the lines being joined at each end by a semicircle having a radius R. A structural support system is provided to externally support the coils. The structural support system has inner support members, where the innermost edge of the innermost coil of each layer is adjacent to the inner support members. The structural support system has outer support members, and the outermost edge of the outermost coil of each layer is adjacent to the outer support members.

BRIEF DESCRIPTION OF THE DRAWINGS

A better understanding of the invention can be obtained when the detailed description of exemplary embodiments set forth below is considered in conjunction with the attached drawings in which:

FIG. 3a is a plan view of an empty cargo container showing the sides of the container lie inwardly relative to the corners of the container, according to the present invention;

FIG. 3b is a plan view of the cargo container of FIG. 3a after it is filled with a fluid under pressure, which shows the sides of the container have expanded outwardly relative to the corners of the container, according to the present invention;

FIG. 3c is a plan view of a container charged with cargo, wherein the container fills most of the volume available within a structurally constraining storage space within the earth, according to the present invention;

FIGS. 4a and 4b show containers charged with cargo and filling most of the volume available within a structurally constraining storage space on a vehicle for transport over land, according to the present invention;

FIG. 6a is a side elevation of a multi-layer cargo tank having a rigid or nearly rigid structural body and a cylindrical cross-section, according to the present invention;

FIG. 6b is a cross-section of the tank of FIG. 6a as seen along the line 6b-6b;

FIGS. 6c through 6f provide a schematic representation of a manufacturing method for making the tank of FIG. 6a, wherein internal pressure against an inner sealing layer establishes the form of the tank, and wherein reinforcing layers of a shell are laid over and bonded to the inner sealing layer;

FIG. 7a is a schematic elevation of a membrane tank in cross-section, wherein an innermost sealing layer is not bonded to a structural outer layer, which provides an annular space between the innermost sealing layer and the structural outer layer, according to the present invention;

FIG. 7b is a schematic elevation of the membrane tank of FIG. 7a showing the annular space partially filled with a fluid for discharging cargo from within the innermost sealing layer, according to the present invention;

FIG. 7c is a schematic elevation of the membrane tank of FIG. 7a showing the annular space essentially completely filled with a fluid for discharging cargo from within the innermost sealing layer, according to the present invention;

FIG. 8a is a schematic elevation in cross-section of a collection of membrane tanks in a shipping container, wherein an innermost sealing layer is not bonded to a structural outer layer that forms the perimeter of the shipping container, according to the present invention;

FIG. 8b is a plan view of a cross-section of the membrane tanks of FIG. 8a, as seen along the line 8b-8b.

FIGS. 8c through 8e provide a schematic elevation in cross-section of the collection of membrane tanks in a shipping container shown in FIG. 8a, wherein an innermost sealing layer is not bonded to a structural outer layer that forms the perimeter of the shipping container, and wherein the figures depict a method where a fluid is injected into an annular cavity between the innermost sealing layer and the structural outer layer for discharging a cargo fluid from within the innermost sealing layer;

FIG. 9a is a schematic elevation in cross-section of a tubular cargo container coiled within a secondary containment carousel structure, wherein the tubular cargo container has an essentially square cross-section, according to the present invention;

FIG. 9b is a schematic representation of a process for laying and coiling a tubular cargo container within a secondary containment carousel structure, wherein the tubular cargo container is laid and coiled within the secondary containment carousel structure in alternating directions on alternating layers;

FIG. 11 is a schematic elevation of an expansion loop in the inner core of the tubular cargo container of FIG. 9a;

FIGS. 12b and 12c are cross-sections of alternative embodiments of the corrugated tubular cargo container of FIG. 12a;

FIG. 13b is a side elevation in cross-section of the cubic cargo container of FIG. 13a.

DETAILED DECRIPTION OF THE EXEMPLARY EMBODIMENTS

Storing and Transporting Natural Gas

Figure 1A:
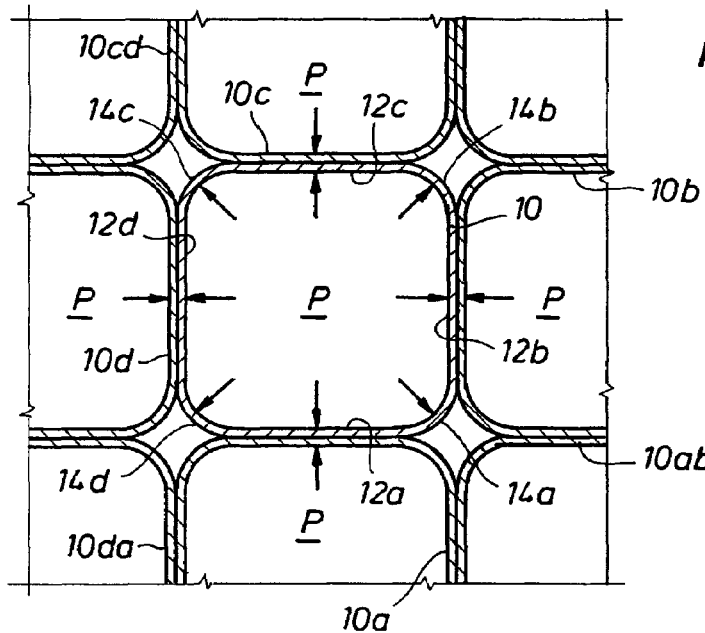
FIG. 1a is a plan view in cross-section of a tank supported by adjacent tanks according to the present invention.

The present invention provides innovative forms of containment for storage and/or transport of fluids, such as natural gas and/or natural gas liquids, as well as innovative means for loading to and discharging from stationary or transportable cargo containers. Highly efficient cargo container design and utilization of available cargo hold spaces within the means of transport can be achieved with the present invention. Cargo containers according to the present invention rely on external support to complement the structural capacity of the container itself. Cargo fluids are stored at very low temperatures and low-to-moderate pressures within the cargo containers. The cargo containers are designed to have polygonal bodies and are shaped such that their structural capacity to contain cold, pressurized cargo fluid normally depends on the support of adjacent containers and/or on the support of walls that define a cargo hold space.

A cargo container according to the present invention essentially comprises essentially flat, planar side walls joined together with rounded or radiused corners and end caps joined to the side walls to define a contained volume within the cargo container. A cargo container according to the present invention can have a variety of custom, polygonal shapes to fit the available space within cargo holds on a ship, railcar or truck or within some means of storage and/or transport. High utilization of available cargo space within a means of transport is achieved by essentially filling the space with a cargo container having side walls, wherein the side walls of the cargo container press outwardly against the interior confines of the sides of a cargo hold space. Alternatively, cargo container side walls may press against the side walls of adjacent cargo containers, or alternatively, cargo container side walls may press against the side walls of some adjacent cargo containers and some portion of the interior confines of the sides of the cargo hold space. The available interior cargo space within the hold or holds of the means of transport may be limited by a layer of insulation between the container(s) and the interior surfaces of the hold.

High ratios for the mass of the contained fluid to the mass of the container are achieved for any relatively high strength material used to produce the polygonal containers of this invention if length of flat surface between the radiused corners that form the transition between adjacent sides of the container are relatively large compared to the radius of the corners.

It is intended that preferred embodiments of this invention would provide for storage and transport of natural gas and natural gas liquids over the ranges of conditions described by Secord and Bishop, meaning at appropriate pressures as mentioned by Secord and Bishop over the temperature range each one targets. Secord targets a temperature range between about minus 130° C. and about minus 80° C., as well as up to about 24° C. as described in U.S. Pat. No. 3,232,725. Bishop targets a temperature below about minus 10° C. Storage and transport of natural gas and natural gas liquids over the ranges of conditions described by Secord and Bishop can be achieved using a container system described herein, injecting cargo fluids into and extracting cargo fluids out of containers taught by this invention according to fluid handling practices described herein. While the preferred cargo for the present invention is natural gas and natural gas liquids, it is understood that the containers and fluid handling practices of this invention may be used for other fluids and storage and transport pressure-temperature combinations to commercial advantage. Secord and Bishop are highlighted here because their methods represent the conditions often used for commercial storage of natural gas fluid cargos in states that are not solid or pure liquid. U.S. Pat. Nos. 3,232,725 and 3,298,805, issued to Secord et al, and U.S. Pat. Nos. 6,584,781, 6,655,155, and 6,725,671, issued to Bishop et al., are incorporated by reference for all purposes.

The containers described herein may be designed and used to efficiently hold a wide variety of gases and gas compositions in dense, pressurized states that may be gaseous, liquid, mixed phase, or even solid (e.g., methane or natural gas hydrates). The pressures at which natural gas and/or natural gas liquids and their associated or added inert components (collectively referred to often as simply "natural gas") are stored and transported are selected to optimize storage efficiency at corresponding operating temperatures (for example, as defined by Bishop). When complex natural gases are stored at low enough temperatures, approaching about minus 160° C., the storage pressure may be set at values as low as about 1.5 bar absolute (bara), which is approximately 22 pounds per square inch absolute or 22 psia. Many of the components of natural gas, such as propane, are commonly stored as liquids within about one or two bar gauge (barg), which is about 14.5-29 psi gauge (psig) of atmospheric pressure by storing at temperatures approaching their atmospheric liquefaction temperatures. A light gas, such as hydrogen, can be stored efficiently in the inventive containers in a relatively dense form at pressures within a few bar of atmospheric pressure when stored at temperatures below about minus 240° C. The containers described herein may be used at the many combinations of pressure and temperature noted in the Secord and Bishop patents, as well as under the conditions described herein that fall outside those ranges, such as for fluids other than natural gas.

The present invention provides high storage efficiency in the sense of the mass ratio between the stored fluid and its container and high utilization of available storage space within a storage facility or within a means of transport such as a ship. The present invention also improves loading and discharge operations in ways that reduce costs and limit residual gas typically left in a containment system.

A preferred embodiment of the container apparatus introduced by this invention is a multi-sided container with distinct arcuate corners and flexible sides through the mid-body. The container can have enough structural rigidity to maintain a basic shape during handling (for instance, during handling for installation in a means of conveyance), without the imposition of any stabilizing internal pressurization. However, if not constrained by external structures or pressures, the sides of the container between corners has a degree of flexibility that allows a maximum center span outward deflection of at least one wall thickness without exceeding the elastic limits of the material or materials used in forming the body of the container when the internal pressure exceeds 10% of the targeted operating storage pressure. Larger center span deflections may be realized without plastic deformation at higher pressures. However, it is likely that the container would experience stresses exceeding code allowances if an internal pressure were applied that approaches the targeted operating storage pressure when no external support is provided for the sides of the container.

In another embodiment, when an externally supporting constraint is provided as a rigid shell portion of an inventive container, where the shell portion completely surrounds a sealing barrier layer inside the shell portion, then the sealing barrier layer may have such high flexibility that sides of that layer may exhibit outward deflections equal to many thicknesses at pressures under 10% of targeted operating pressure. In fact, it is intended that the sealing barrier layer should extend until fully supported by the rigid shell portion of the container.

In many cases, a cargo container will be surrounded by a secondary containment structure that provides a secondary sealing skin to capture and safely manage any cargo fluid that might leak from the cargo container. In a preferred embodiment, the secondary containment structure may, in fact, actually provide structural support and/or constraint to the cargo container. For example, the hull structures of a ship surrounding the cargo containers of this invention should be designed to be a very robust structure to carry the weight of the cargo containers and the cargo fluid and to withstand the forces imposed in a dynamic marine environment. The inherent strength of such robust ship hulls can be effectively utilized to support the non-rigid sides of the cargo containers described herein when such containers are pressurized with cargo fluid charges, without substantial increase in hull costs. It is not believed that any prior art CNG or PLNG design considers that the walls of the holds, which are inherently part of a ship's structures, should be designed as support for the sides of cargo containers located within the ship's holds. Taking full advantage of such necessary structures and structural capacity, which have great strength regardless whether supporting the walls of the cargo containers or not, is a great cost savings feature of the present invention.

Similarly, the structural capacity of the sides and frame of standard shipping containers, as defined by the International Standards Organization or ISO, which are occasionally called "ISO boxes," may be enhanced to provide desired insulation and support to the sides of the non-rigid cargo tanks of this invention at little cost increase over the basic cost of conventional ISO boxes. As a result, an ISO box modified to reflect the features and to support the cold CNG cargo tanks of this invention becomes a vastly superior means for transporting natural gas as compared to existing CNG rail and trucking concepts.

If the stored fluid is a combustible, like natural gas, then the space between primary containers and a secondary containment system will likely be filled with a cold, inert gas. Since the stored fluid is intended to be kept at very low temperatures and since it is desirable to limit the amount of heat penetrating from the ambient environment into the primary containers, the surface of the secondary containment system will usually be well insulated. Only in cases where individual tanks are very large and the skin is not allowed to substantially deflect in ways that would be damaging to the insulation would the skin of the primary container have the insulating layer(s) directly applied.

By fabricating and installing containers that can deform to expand when filled with pressurized cargo, it is conceived that a higher percentage of available volume in a storage facility or in/on a selected means of conveyance can actually be occupied by the fluid intended to be stored and/or transported as compared to prior art systems.

In one embodiment, the present invention provides that the shells or skins of the body of the containers should be constructed from sheets of ultra-high strength membrane materials manufactured with durability for storage temperatures substantially below 0° C., preferably between about minus 40 (−40)° C. and about −130° C., and designed with flexibility such that pressure containment is provided principally by membrane action, meaning the skins have great strength but relatively little bending stiffness over the dimensions they are spanning. One such material may be thin, ultra-high strength steel alloy sheets formed by modern mill practices with yield strengths above 689.5 megapascals (689.5 MPa or approximately 100,000 psi). However, in nearly all cases the minimum effective material yield strength should exceed about 50,000 psi and should preferably exceed about 70,000 psi, which is about 483 MPa.

Alternatively, natural and/or synthetic membrane materials of comparable strengths can be produced by viruses or phages through genetic design and manipulation of their ability to construct carbon molecule nanostructures (nano-tubes or membranes) called nano-materials by researchers such as Professor Angela Belcher of the Massachusetts Institute of Technology (MIT). See also U.S. Patent Application Pub. No. 20060254503, filed by Dai et al. and assigned to Cambrios Technologies Corp., which is incorporated by reference.

The sheets of materials forming the skins of these containers may be joined at seams, whether edge to edge or with overlapping edges to form layers of the container, by any of a number of bonding techniques known to those knowledgeable in the art, such as welding or gluing. Further, the layers may be bonded to each other by any of a number of bonding techniques known to those knowledgeable in the art according to the demands of layer-to-layer interaction for the intended service that can be discerned by modern analytical methods. For example, explosion bonding may be used to bond together sheets of dissimilar metals. Explosion bonding (EXW) is a bonding method in which the controlled energy of a detonating explosive is used to create a metallurgical bond between two or more similar or dissimilar materials. No intermediate filler metal, for example, a brazing compound or soldering alloy, is needed to promote bonding, and no external heat need be applied. Also, explosive welding is considered a cold-welding process that allows metals to be joined without losing their pre-bonded properties. The transition joint has high mechanical strength, is ultra-high vacuum tight and can withstand drastic thermal excursions. Explosion bonded sheets and forms are commercially available from suppliers such as High Energy Metals, Inc. of Sequim, Wash.

Figure 1B:
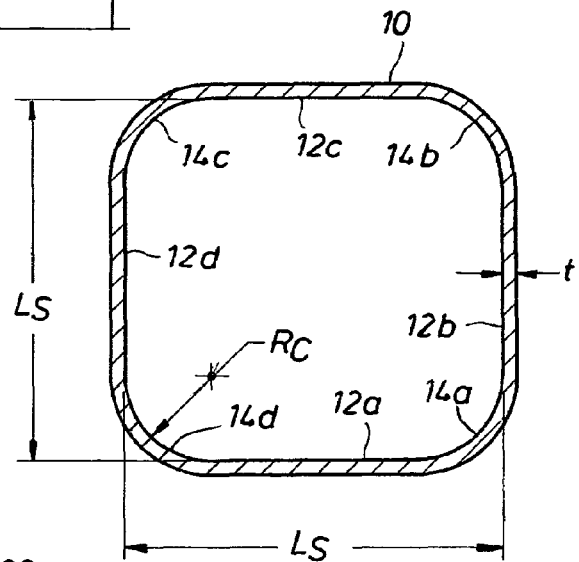
FIG. 1b is a plan view in cross-section of a tank with dimensional nomenclature used in the description of the present invention.
Figure 2:
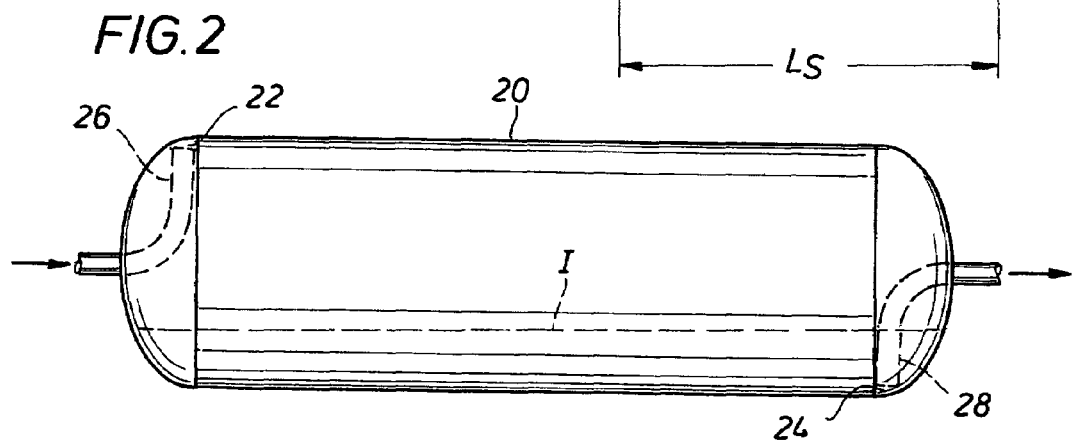
FIG. 2 is schematic diagram of a cargo container showing preferentially definable low and high points where dip tubes provide flow paths for access and egress of cargo and/or displacement fluids.
Figure 5A:
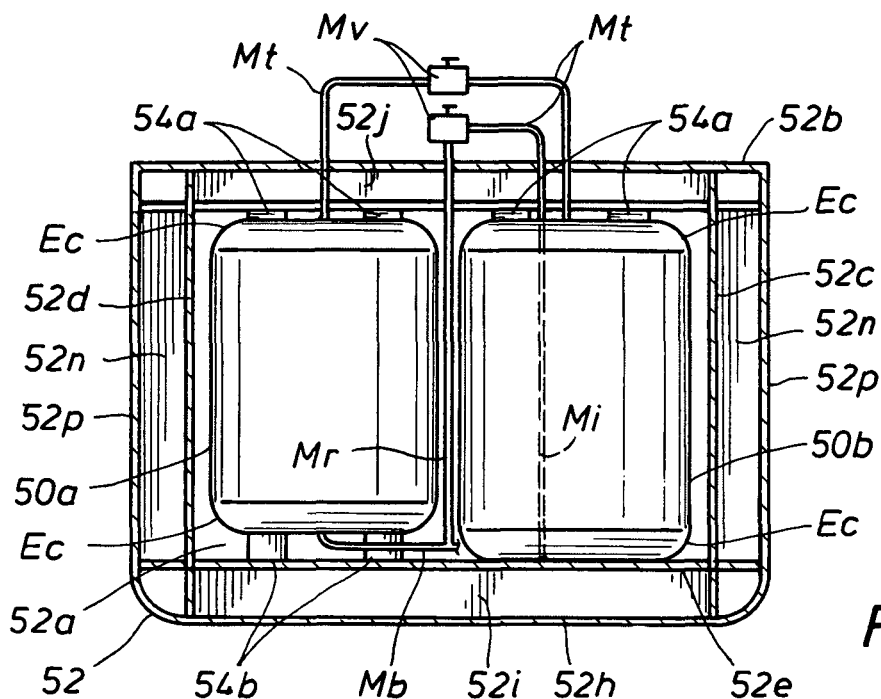
FIG. 5a is a schematic diagram of an elevation showing a cross-section of a ship and providing a side view of empty containers in a hold, according to the present invention.

Turning now to the drawings, with reference to FIGS. 1a and 1b, the present invention provides in one embodiment a tank 10 that has relatively thin and flexible wall sections 12a, 12b, 12c and 12d, which are referred to generally as wall section 12. A rounded or radiused corner 14a joins wall section 12a to wall section 12b. Similarly, rounded or radiused corner 14b joins wall sections 12b and 12c, corner 14c joins wall sections 12c and 12d and corner 14d connects wall section 12d to wall section 12a. Rounded or radiused corners 14a, 14b, 14c and 14d are referred to generally as corners 14. Opposing and relatively thick and rigid end caps 16a and 16b, which are not shown in FIGS. 1 and 2, are joined to wall sections 12 and corners 14 to define a contained space inside tank 10. FIG. 5a, discussed below, shows a side elevation of a typical tank with end caps like end caps 16a and 16b. None of the drawings are to scale. The drawings are only intended to illustrate the principles of the present invention, not specific dimensions.

With reference to FIG. 1a, tank 10 is surrounded by similar tanks. A tank 10a has a side wall adjacent to side wall 12a of tank 10. A tank 10b has a side wall adjacent to side wall 12b. A tank 10c has a side wall adjacent to side wall 12c. A tank 10d has a side wall adjacent to side wall 12d of tank 10. A tank 10ab is adjacent to tanks 10a and 10b. A tank 10bc is adjacent to tanks 10b and 10c. A tank 10cd is adjacent to tanks 10c and 10d. A tank 10da is adjacent to tanks 10d and 10a. Tanks 10a, 10b, 10c, 10d, 10ab, 10bc, 10cd, and 10da are only shown in partial cross-sections.

Wall sections 12 of tank 10 are thin and flexible relative to thick-walled and rigid tanks proposed in the prior art to transport or store natural gas under the range of conditions noted by Secord and Bishop. Prior art containers for storing gas under pressure have typically had cylindrical or spherical shapes, which have a circular cross-section. Tank 10 of the present invention instead has an essentially square cross-section. This basic feature of the CNG tank of the present invention is depicted in FIG. 1a, where tank 10, with non-rigid side wall sections 12, is shown in a cross-section plan view constrained to an essentially square cross-sectional shape with rounded corners. Wall sections 12a, 12b, 12c and 12d are somewhat flexible as compared to a prior art high-pressure gas container. Consequently, under operating pressure P, side wall sections 12a, 12b, 12c and 12d would tend to extend outwardly. Since tank 10 does not have a rigid cross-section, it would tend to take a circular shape and possibly experience stress levels exceeding code allowances) when fully pressurized to operating pressure P with cargo, if there were no independent, external side constraint. However, adjacent tanks 10a, 10b, 10c and 10d, as well as tanks 10ab, 10bc, 10cd and 10da are also under operating pressure P. Pressure forces pushing outwardly against side wall sections 12a, 12b, 12c and 12d of tank 10 are countered by opposing forces created by pressure forces pushing outwardly on the side wall sections of adjacent tanks 10a, 10b, 10c and 10d. The opposing sides of essentially identical, adjacent tanks operating at equal pressure P have essentially equal and opposite forces acting on them such that the forces counter and neutralize each other. The pressure acting across the skins of adjacent tanks and/or surrounding structures determine the cross-sectional shape of tank 10. Tanks 10a, 10b, 10c and 10d provide external support to side walls 12a, 12b, 12c and 12d of tank 10, which reduces and limits stresses within its wall sections 12a, 12b, 12c and 12d. The external support for the side walls 12 of tank 10 provided by adjacent tanks 10a, 10b, 10c and 10d allows a reduction in the strength and/or thickness of the wall sections 12a, 12b, 12c and 12d as compared to a prior art rigid cylinder of circular cross-section operating at pressure P. A prior art rigid cylinder relies solely on the strength of its wall section to counter the forces exerted by operating pressure P. Prior art high-pressure gas containers have sufficiently thick side walls to hold gas under pressure P, without the aid of external support. Tank 10 of the present invention relies on external support, in addition to the strength in its wall sections 12, to contain a fluid under pressure P, and in FIG. 1a, the external support is provided by adjacent tanks 10a, 10b, 10c and 10d, which are in turn supported externally by tanks 10ab, 10bc, 10cd and 10da.

The tanks surrounding tank 10 could be supported by another ring of identical pressurized containers or by rigid walls that define a cargo hold space. Thus, structural members that define a hold in a cargo ship may also serve to provide external support to tank 10 and/or to the tanks that surround tank 10. Tank 10 and the surrounding tanks will typically be in a refrigerated cargo hold, which will typically be insulated. Tank 10 and the surrounding tanks will press against the insulation, which will be compressed between tank wall sections and the structural members that define the boundaries of the cargo hold. Consequently, the insulating material on the internal perimeter of the cargo hold should be designed to withstand the compressive load imposed by the skin of any container intended to contact that insulating material.

FIG. 1b shows typical dimension labels that will be applied to describe geometrical features of tank 10 of FIG. 1a. As discussed in further detail below, $L_S$ is the internal length along each side of tank 10, $R_C$ is the internal radius at each corner 14 of tank 10, and t is the wall thickness of each of wall sections 12a, 12b, 12c and 12d and each corner 14.

The containers may have a principal dimension along an axis of symmetry that can be defined as the length of the container. The container may be supported and/or constrained in a way that the principal axis of the length dimension may be oriented vertically (in which case, length may also be considered to be height), horizontally, or at some inclination to horizontal such that a lower end and a higher end may be clearly defined as the bottom end and top end of the container, respectively. If the containers are disposed on the means of conveyance in a horizontal orientation, the conveyance itself may be tilted to establish a lower end and upper end to the containers onboard.

With reference to FIG. 2, if a container is not disposed vertically, then it may be necessary to provide supports that incline the container slightly. FIG. 2 shows a cross-section of a side elevation of a container 20. Container 20 has a high point 22 and a low point 24, which may be induced by how container 20 is supported, which is not shown. An inlet tube 26 allows a fluid cargo to be introduced into container 20 at high point 22. A dip tube 28 allows fluid cargo to be withdrawn from container 20 from low point 24. A flow path allowing preferential fluid access and egress is provided by inlet tube 26 and dip tube 28, as shown in FIG. 2. A light gas can enter through inlet tube 26 at the high point 22 to force a denser fluid, such as a liquid, out through dip tube 28 at the low point 24. An interface I between the light gas entering through the high-side inlet tube 26 and the liquid that would be forced to exit from the low-side dip tube 28 is shown and indicates the tilted orientation of container 20.

As indicated, individual containers are expected to have a definable length dimension that may be generally oriented vertically or horizontally with regard to their primary axis of symmetry along the length. Alternatively, as described below, an extremely long container may be coiled to aggregate its containment volume within a compact spiral arrangement. The coiled containers in this invention are conceived to have both top and bottom flow path connections to and from the coil.

The shape of the container when filled with pressurized cargo can be defined by an inherently pre-disposed configuration of constraints imposed by the materials, reinforcements, and internal or external frames incorporated in the body or end caps of the container, as well as by any external constraints imposed by adjacent containers or surrounding structures. For example, the cargo container may have a generally cylindrical shape when standing in isolation, but when surrounded closely by containers of the same basic shape that are being simultaneously pressurized (as would happen if all the containers within one cargo space were manifolded together), the resultant shape could be more of a squared shape (or other polygonal form), depending on the disposition of the surrounding containers.

As shown in FIGS. 3a and 3b, the bodies of the containers of the present invention are comprised of skins that are designed to safely allow deformation to some degree when filled with pressurized cargo. FIG. 3a schematically illustrates a plan view of a container 30 having side walls 32a, 32b, 32c and 32d. A rounded corner 34a joins side wall 32a to side wall 32b. A rounded corner 34b joins side wall 32b to side wall 32c. A rounded or radiused corner 34c joins side wall 32c to side wall 32d. A rounded corner 34d joins side wall 32d to side wall 32a. Container 30 is unpressurized in FIG. 3a. Containers 30 is predisposed to form a multi-sided cross-section with generously rounded corners 34, such as a square depicted by dashed lines 36, when filled with pressurized cargo due to a relatively high degree of stiffness at a selected number of locations that define the corners of the polygonal form. In one embodiment, this local stiffness may be configured as part of the skin of the container. In such cases, the material at the corners may be substantially thicker than the material forming the side panels between them. In others, the corners may be defined by pre-forming (e.g., rolling) or internal or external supporting frames or structures surrounding the skin of the container.

Additionally, the shape of container 30 when filled may be determined by a combination of the above constraining features. FIG. 3b shows container 30 of FIG. 3a after container 30 is filled with a pressurized cargo, such as natural gas. If there are no external constraints, container 30 will tend to bloat when pressurized as shown in FIG. 3b. After container 30 is filled with a fluid cargo and is under pressure, forces created by the pressure expand side walls 32a, 32b, 32c and 32d outwardly, which is shown in FIG. 3b as compared to container 30 in FIG. 3a. As noted previously, a tank that is designed to depend on external support could be overstressed relative to code allowances if charged to a pressure approaching the targeted operating storage pressure if external support is not provided. However, these tanks can maintain a stable form and do not depend on external support to be stable for handling purposes when not installed or not subjected to the intended service pressures. No external support is shown for container 30 in FIG. 3b, but some form of external support would typically be provided.

When the internal pressure of the containers has been decreased to near or below ambient pressure, the sides of the containers can be designed and fabricated such that they collapse inwardly, decreasing the containers' internal volume and creating spaces for inspection access between adjacent containers and surrounding structures. Such inspections occur infrequently, usually no more often than once per year in maritime practice, and require that all hazardous cargo fluids be removed from containment and replaced by inert gas or air to allow safe access for inspectors. On such infrequent occasions, the internal pressure may be dropped below ambient pressure (1 bara) or the pressure surrounding the containers may be increased slightly above ambient pressure to cause a force imbalance assisting the return of the container to its unexpanded (retracted) lobed form (e.g., the form of container 30 in FIG. 3a).

Since it is intended that this invention will make it possible to design and build containers of such large cross-sections that internal access for inspection is practical, the ability of these containers to contract away from surrounding barriers is not a requirement. However, it is a feature that provides an advantage over rigid containers.

FIG. 3c is a schematic cross-section plan view of a container C in an embodiment where external support and secondary containment are provided. Container C has been placed in a mined or bored shaft, chamber or hole H that may extend many meters deep into the earth E. Container C is sealed within the earth E surrounded by reinforced concrete walls G. Concrete wall G may be reinforced with steel re-bar or high-strength fiber materials as necessary to supplement the structural capacity of the surrounding strata within the earth E. The traditional practice of pre-stressing may be implemented to ensure that the reinforced concrete enclosure G maintains structural integrity in spite of pressure loads imposed outwardly by expansion of container C when container C is under operating pressure. The concrete perimeter of the shaft G may serve as an insulating material if it is composed of an appropriate aggregate and/or if it contains voids. Otherwise, container C can be designed or an insulating material can be added to provide the insulation necessary to limit heat gain in container C to practical levels.

The following describes a method by which the cross-section of a tank, such as container 30 in FIGS. 3a and 3b or container C in FIG. 3c can be designed and fabricated to store a gas or fluid similar to the typical Sahara gas studied by Secord (88.8% methane with a critical temperature of minus 57° C.) in a permanent storage facility comprised of a single storage tank that extends from the surface of the earth downward in an insulating concrete shaft, such as illustrated in FIG. 3c.

The storage tank is a single squared-section container with 1 meter (1 m) radius corners. The container is to be built or installed vertically in a reinforced-concrete shaft that provides an internal chamber about 10 m by about 10 m square (and at least about 30 m long). The concrete shaft is assumed to be essentially rigid and thermally insulating. For less rigid secondary containment, finite element analysis should be used to determine the effective stress levels to be carried by the skin of the primary container because hoop-like stresses can be developed across the panel segments of the section— not just at the unsupported corners.

The details of the end closure elements will be designed according to an engineering assessment of the restraints and supports specific to individual installations, but such details are not the focus of this invention. The end closures and nozzles and means for affixing them to the bodies of the containers should be designed to meet appropriate pressure vessel standards. Those knowledgeable in the art will know how to use Finite Element Analysis methods to ensure that stresses throughout the end closures (including nozzles) and the complex transition features between those end closures and the bodies of the containers meet standards.

The container body is to be fabricated from plates of high strength metal alloy (such as about 689 MPa yield strength) with toughness adequate to safely operate at the temperatures selected for the demonstration cases below. The plates can be explosively bonded where edges overlap or welded to each other where they abut. Welds should be treated (e.g., ground flush or stress relieved), if necessary to comply with pressure vessel code practice. For the temperatures in the range from about −40° C. to about −120° C., modern mill practice can produce plates of the strength and thickness required for this application from suitable steel alloys with less than about 3% nickel content. So, a multi-layer structure of ultra-high strength sheets is not required for the current example, but could be practiced if weight reduction was a design objective to ease installation of a completed tank.

In this example, the container body is fabricated with constant wall thickness throughout, without thickening at the corners. However, it may be desirable to use thicker plate at the corners to provide some stiffness and rigidity to the container for ease of handling during transport and/or installation of the container.

The material intended to form the corners is rolled to form about one quadrant of a circular arc with a radius of curvature slightly less than 1.0 m. The side panels can be initially fabricated as essentially flat planes running from one corner panel to another corner panel, with one side panel parallel to an opposite side panel, thus establishing a basic rectilinear form.

Prior to installation, a tank, such as container 30 in FIG. 3a, can be internally over-pressured, such as container 30 is depicted in FIG. 3b, expanding outward beyond the basic squared shape to the point where limited yielding occurs and the arc of the corners opens up to a full 1 m radius. If the internal over-pressurization occurs when the sides of the tank are unconstrained, the pressure to be applied to cause the yielding is only a fraction of the storage pressure to be applied once the tank is installed within the storage shaft (approximately one-quarter as much for the current case). After the internal over-pressurization, an external over-pressurization (substantially less than the pressure applied internally, can cause the side panels to move inwardly to a lobed form such as shown in FIG. 3a, such that the side panels deform inwardly to prepare the tank for installation.

Alternatively, plastically deforming over-pressurizations may be practiced after the tank has been placed within the secondary containment. The amount of internal over-pressure required will depend on the clearance between the tank and the inner surface of the secondary container (i.e., the shaft in the current example). If it is a relatively tight clearance, then the internal pressure to cause the desired deformation may actually exceed the storage pressure. However, if the clearance is tight, internal over-pressurization may never be required. In such cases, natural elastic deformations during pressurization of loading operations will bring the storage container in contact with the supporting secondary containment wall (or insulation). A slight internal vacuum may be needed during installation to ensure that the tank panels are retracted away from and do not bind against the sides of the concrete-lined shaft as the storage container is being lowered down into the shaft.

The thickness of the storage container skin should be designed to withstand stresses in the transverse and longitudinal directions, as well as compressive stresses caused by the reaction to internal pressure where the side walls of the tank contact adjacent supporting tanks or structures—even though the compressive stress due to internal pressure is expected to be very low according to the practices of this invention.

Since the walls of the reinforced shaft constrain the skin surface against radial deformation, except at the radiused corners, when the tank is at operating pressure, the internal pressure force acting along the side panel segments will flatten the side panel segments against the walls of the shaft. The outwardly-directed force caused by the internal operating pressure within the storage tank will push the side panel segments outwardly. However, an equal and opposite reaction force will be provided by the concrete and earth that surround the storage tank, which will limit the amount of outward movement of the side wall panels of the storage tank. Thus, with reference to FIG. 3c, the outward force caused by the pressure of a stored natural gas or other fluid in container C is exactly countered by the reaction of the rigid wall that defines the hole H, and the reaction force is provided by strength within the concrete wall G and the earth E. Only the pressure acting across the unsupported circular quadrants at the corners of container C contribute to the development of an effective "hoop stress" in the skin, which with reference to FIGS. 3a and 3b, is the side walls 32a, 32b, 32c and 32d. The smaller the radius at the corner, the thinner the wall of the container needed. Therefore, the storage pressure and plate thickness can be established according to the method of Bishop, but with an artificially defined/constrained effective radius.

While it is possible to contemplate a scenario where the volume of the space between the primary and secondary containment is pressurized to some degree, it is assumed that the space is filled with a chilled inert gas at nearly atmospheric pressure in the present example.

The required membrane thickness to accommodate the effective "hoop stress" may be calculated as equivalent to a circular pipe of internal diameter, $D_I$ (=2×$R_C$, where $R_C$ is the effective corner radius (after deformation and filling to operating pressure) as defined by contact of the tank with the sides of the shaft as shown in FIG. 3c) as:

$$t=(D_O-D_I)/2=(P \times R_C)/(S \times F) \qquad \text{Eqn. 1}$$

[from Eqn. 4 in Bishop's U.S. Pat. No. 6,584,781] where, t is the wall thickness of the membrane container throughout the corners (and the panel segments in this design case), $D_O$ is the outside diameter through the corner, P is the internal pressure in excess of any externally acting pressure and for the purposes of this design example may be considered as equal to the storage pressure, S is the yield strength of the material (in this case, about 689 MPa or about 100,000 pounds per square inch), and F is the safety factor, being the utilized portion of S allowed by codes like the ASME pressure vessel codes.

The storage pressure, P, may be selected according to Bishop (to optimize the ratio of mass of gas to mass of container) if dense phase storage is being practiced (per Bishop's U.S. Pat. No. 6,725,671). Whereas, if mixed phase storage is being practiced as per Secord's U.S. Pat. No. 3,298,805 at storage temperatures between −129° C. to −90° C. with very low storage pressures between about 1 MPa to about 4 MPa, then P (for design purposes) may not be equal to storage pressure; but may be equal to the pressure needed to displace the cargo out of storage against the back pressure imposed by the receiving facilities when the stored natural gas is being discharged.

Following Bishop's dense phase storage approach for Secord's Saharan gas at the minimum value of the compressibility factor (Z), P (the storage pressure) would be selected as 9.6 MPa for storage at −40° C. (1392 psig at −40° F.) and the wall thickness, t, would be approximately 19.9 millimeter (19.9 mm) for the tank in this case study if F is assumed to equal 0.7 (which is a reasonable value for pressure vessel design according to current editions of the ASME Pressure Vessel code) and no corrosion allowance is included.

If dense phase storage of the gas is practiced at just above the critical temperature for this gas, say −56.7° C. (−70° F.), then the gas would be stored at 6.9 MPa (1000 psig) and t would be about 14.3 mm for the tank.

If the Saharan gas is stored in mixed phase at the minimum temperature proposed by Secord, the storage pressure (1.54 MPa at −112.2° C.; 224 psia at −170° F.) would often be too low to allow blow-down against the back pressure from infrastructure. So, scavenging compression may be used throughout the process of discharging the stored fluid and the highest internal pressure that the cargo container ever experiences will be determined by the set point of relief systems (typically within about 5% of the normal operating pressure or about 1.62 MPa). Assuming that P equals 1.62 MPa, the minimum wall thickness for this case would be less than 4 mm based on Eqn 1.

Alternatively, if a cargo displacement operation is used, it should be noted that a typical pipeline infrastructure may be assumed to impose a back pressure for design purposes of at least 4 MPa, but usually higher. Therefore, this case study assumes a 5 MPa displacement fluid pressure is needed to ensure efficient discharge. In such a situation, it would be rational to use the highest temperature-pressure combination noted by Secord for the Saharan gas, that is −90° C. (−130° F.) and 4 MPa. The container wall thickness would only need to be about 10.4 mm to contain the 5 MPa pressure during cargo displacement operations.

Before these values can be accepted as the actual wall thickness for design, the effects of longitudinal stress from the internal pressure acting on the end closures and the compressive stress acting along the flattened wall segment should be assessed. If the weight of the end closure and any external restraints are ignored, the walls of the tank should be designed to carry a vertical tensile load caused by internal pressure and the minimum required wall thickness can be calculated according to the formula:

$$t=(P \times A)/(L_W \times S \times F) \qquad \text{Eqn. 2}$$

where, P, S, and F are as defined above;

$$A=L_S^2-(2 \times R_C)^2 \times (1-\pi/4), \text{ the internal cross-sectional area of a squared tank; and,} \qquad \text{Eqn. 3}$$

$L_W$=the length of the wall as measured around the perimeter of the tank section (since the tank wall is relatively thin, it is reasonable to use an approximation of the mid-wall length around the section as being $4 \times (L_S-D_I)+\pi \times D_I$.

According to the above formula and to ensure that longitudinal stress also remains below 70% of yield strength, the allowed wall thickness should be about 51.5, 37, 8.7 and 26.88 mm for each of the above cases of temperature-pressure combinations, respectively. The required wall thickness according to hoop stress limitations calculated in the above cases was 19.9, 14.3, less than 4 and 10.4 mm. Therefore, the longitudinal stress appears to substantially control determination of wall thickness in the example cases. Consequently, the thicker wall required to ensure that longitudinal stress remains below 70% of yield strength dictates the required thickness of the longitudinal portion of the storage tank.

However, the compressive stress (=P) acting across the wall should also be considered, even though storage pressures practiced according to this invention will generally be very small as compared to the effective yield strength of the membrane tank skin material(s). As a convenient and slightly conservative approach, the ASME Pressure Vessel Code (Sect. VIII, Div. 2) recommends that a shear stress check may be taken as an alternative to calculating required wall thickness on the basis of maximum principle stress. On this basis, the required wall thickness can be determined as being the maximum of either the value driven by longitudinal stress or hoop stress as combined with the compressive stress across the wall according to:

$$t_L=(P \times A)/((L_W \times S \times F)-P) \text{ or} \qquad \text{Eqn. 4}$$

$$t_H=(P \times R_C)/(S \times F-P) \qquad \text{Eqn. 5}$$

respectively, where the variables are as previously defined. The wall thickness requirement will be controlled by Eqn. 4 if the length of a side is much greater than the corner radius and by Eqn. 5 if the corner radius is larger than about 38% of $L_S$. A $t_{MAX}$ can be defined as the larger of two shear stress check values for wall thickness calculated from Eqns. 4 and 5.

Alternatively, the container may be pre-stressed to induce compression longitudinally to ensure that longitudinal stress does not control the wall thickness calculation. One simple way to create a longitudinal compressive pre-stress would be to use a heavy top-end closure or to simply place a weight on the top of a vertically-oriented tank such that the tank wall supports the imposed weight when internal pressure is at the ambient value. Another way is to pre-stress by tensioning external structural elements (e.g., tie-rods as used in pre-stressing concrete). If such a pre-stressing approach is used, the designer should ensure that specification of a small corner radius does not push the design to such thin wall that instabilities, such as classic column-buckling collapse, occur. To provide pre-stressing for the container side walls, the top cap can be fastened to the bottom cap using external or internal tie rods, where each tie rod is located in the bore of a pipe of a pre-determined length to prevent column-buckling collapse of the side walls. In addition, multiple concentric pipes could surround each rod with each concentric pipe being just slightly shorter than an adjacent pipe to provide a variable resistance as the concentric pipes are compressed. One can also use hydraulic jacks on the tie-rods to ensure that a controlled pre-loading is only applied when there is adequate internal pressure to ensure that the tank does not collapse. If a form of controlled collapse is desired, such as for an expandable tank in some variations, such tanks may have an allowable form of collapse. A passive alternative to a high pre-load (or adjustable jacks) is to have rods that are just stiffer axially than the tank walls, so that the load applied by the rods increases quickly as the tank tries to grow longitudinally. Tensioned bands or wires can also be used. For example, carbon fiber bands or rods can be very stiff compared to cylinder walls of steel.

For a tank of specified material strength intended to contain a fluid under a specified design pressure in a square shaft of a given width dimension, this invention teaches that, if the storage pressure is very low as compared to the yield strength of the material (say, <S/100), the corner radius or the length along each side of the square shaft can be adjusted until the t values required by Eqns 1 & 2 are roughly equal. By matching up Eqn. 1 with Eqn. 2, it can be seen with simple calculations that the length on each side of the square shaft should be approximately 3.77 (3.7 to 3.8) times the value of corner radius of the storage container. External constraints or practice (like inspection access requirements) may prevent the designer from adopting a perfect match. However, if the tank ends can be pre-loaded such that compressive stresses from pre-loading offset the longitudinal tensile stress from the pressure acting on the end closures, then the side length-radius ratio ($L_S/R_C$) can substantially exceed 3.77. For example, if the container is longitudinally pre-stressed to a value about equal to the targeted operating storage pressure, then $R_C$ could be reduced until the side length/radius ratio becomes approximately 7.54 and the required wall thickness would be nearly cut in half. However, the designer should ensure that buckling collapse is controlled. In general, the side length-radius ratio ($L_S/R_C$) can typically range from about 1.5 to about 12, preferably from about 2 to about 8, more preferably from about 3 to about 5 and most preferably from about 3 to about 4, with a value of about 3.77 being more typically preferred. With the 3.77 value for the side to radius ratio as a starting point, one can go to a higher ratio in proportion to the amount of longitudinal pre-loading force to be applied to reduce the force generated by the internal pressure acting on the end closures, which is the product of pressure times area, P×A, in Eqn. 2.

In the case currently being considered, the constraint on wall thickness can be better matched if the radius of the corners were increased or the width of the tank sides decreased. For example, if the width of the tank on each side was decreased to about 3.8 m, then the wall thickness as limited by the longitudinal stress constraint would match the thickness allowed by the 1.0 m radius at the corners. Alternatively, if the tank side width was kept at 10 m, then the radius at the corners could be increased to about 2.65 m to have the predicted wall thickness requirements match each other.

The relationship between the wall thickness value calculated according to the three stress checks can be illustrated for the current four study cases by considering this specific cross-section sizing in more detail, as reflected in Table 1.

TABLE 1

| For $L_S = 10$ m, $R_C = 2.65$ m | | | | | |
|---|---|---|---|---|---|
| T = | −40 | −56.7 | −112.2 | −90 | C. |
| P = | 9.6 | 6.9 | 1.62 | 5 | MPa |
| $t_{(EQN.\ 1)} =$ | 52.71 | 37.88 | 8.89 | 27.45 | mm (hoop only) |
| $t_{(EQN.\ 2)} =$ | 52.72 | 37.90 | 8.90 | 27.46 | mm (longitudinal) |
| $t_{MAX} =$ | 53.78 | 38.43 | 8.92 | 27.74 | mm (combined) |
| For $L_S = 10$ m and $R_C = 1$ m | | | | | |
| $t_{(EQN.\ 1)} =$ | 19.89 | 14.30 | 3.36 | 10.36 | mm (hoop only) |
| $t_{(EQN.\ 2)} =$ | 51.51 | 37.02 | 8.69 | 26.83 | mm (longitudinal) |
| $t_{MAX} =$ | 51.54 | 37.04 | 8.69 | 26.84 | mm (combined) |
| For $L_S = 10$ m and $R_C = 4$ m | | | | | |
| $t_{(EQN.\ 1)} =$ | 79.56 | 57.18 | 13.43 | 41.44 | mm (hoop only) |
| $t_{(EQN.\ 2)} =$ | 51.79 | 37.22 | 8.74 | 26.97 | mm (longitudinal) |
| $t_{MAX} =$ | 81.18 | 58.01 | 13.47 | 41.87 | mm (combined) |

The method for establishing the design wall thickness according to the equations and calculations presented above works even if the surrounding structures constrain the form of the container to be some rectilinear or polygonal shape other than square (for example, a hexagon). It is also worth noting that at very low storage pressures, it is reasonable to use only Eqn. 1 in concert with Eqn. 2 to estimate the minimum wall thickness of the container's skin, since the compressive stress across the wall will be negligible.

With the values presented in the two cases for dense phase storage, it can be noted that the sectional mass of gas over mass of container ratios are about 1.3 and 1.9 at −40° C. and −56.7° C., respectively. The warmer mixed phase storage case at −90° C. offers a mass ratio exceeding 4. Bishop seeks to optimize for circular storage cylinders in the range of 0.15 to 0.5 for the mass ratio storage efficiency factor he defines, so it is clear that this invention offers nearly an order of magnitude improvement in the storage and transport of natural gas for containers made with materials of the same yield strength Bishop considers.

Storage tanks with 2.65 m radius corners within a 10 m by 10 m secondary containment, operating at the storage conditions noted for the cases evaluated above would have significant capacity. If the mined shaft allowed a 100 m long tank body, the tank would hold about $2.5 \times 10^6$ standard cubic meters (2.5e6 scm) for the warmest case studied. The fluid density in the coldest storage option modeled would be almost twice the density achieved by this warmest storage case (i.e., Secord notes that his Saharan gas at −112.2 C and 1.54 MPa storage conditions has a mass density about 485 times as great as at ambient conditions, while Bishop's storage of the Saharan gas would be at only about 274 times as dense). Therefore, the same size tank could contain well over 4e6 scm (~150e6 standard cubic feet or scf).

When very tall tanks are being designed, the hydrostatic head from the dense stored fluid should be considered in the wall thickness calculation. This aspect is only important in cases where the effective hoop stress is at least as important as the longitudinal stress, which is where the corner radius is over 27% of $L_S$. In such cases, it may be more economical to split the storage among four 25 m tall tanks to avoid a substantial increase in wall thickness requirement over the lower section of the 100 m tall tank. If the corner radius is set well below the 27% target, hoop stress will not control the wall thickness. Accordingly, since the axial stress component does not change with changing tank height for tanks supported at the bottom, the hydrostatic effect would not be a design driver.

If the tank is suspended from its top end, then the axial load used in determining required wall thickness should include the weight of the tank (sides and bottom closure) as well as the cold, dense stored fluid in addition to the internal pressure load.

A 100 m long tank body could be built on site, such as by lowering and fastening together 25 m sections, into a shaft that has been dug. The shaft can first be lined with concrete and the tank then lowered into the lined shaft, or the tank can be lowered into an unlined shaft, and grout can be pumped into the annular space between the outside of the tank and the inside of the hole. Alternatively, a long tank body can be buried horizontally. In any case, the concrete and earth will provide support for the tank walls, which can expand outwardly until supported by the concrete and earth.

In the preceding case, the examples would all be expected to fit relatively tightly into the storage confines of the reinforced concrete walls. Thus, there would be very little outward displacement of the walls until they met up with the supporting reaction from the surrounding walls. In this way, the stresses within the container's walls easily stay within the intended allowable values. However, it is worth considering the deflections that could occur for tanks designed according to the current approach when they are pressurized without any external support—for example, during leak testing or handling.

Considering a maritime example using the above principles, a ship may be designed to carry approximately 7.1e6 scm (~250e6 scf) of Secord's Saharan gas at about −90° C. and about 4 MPa in 36 tanks distributed in groups of 9 each (manifolded together) in four cargo holds. The ship's hull would be approximately 150 m long and the wing tanks and void spaces between holds would likely be about 4 m wide to provide enough structural stiffness to support the cargo tanks when they are pressured up. Each of the 36 tanks are assumed to be specified to have a squared cross-section that is 6 m by 6 m with 1.6 m corner radii and be 12 m long (including end caps). According to long established U.S. Coast Guard practice for approval of pressure vessels, the hoop stress would be limited to about half of the material's yield strength. So, if the tank wall is a steel material with a yield strength of about 690 MPa, the minimum required wall thickness (without a corrosion allowance) would be about 19 mm. Since internal inspection would be possible with these tanks and the cargo is non-corrosive, it is reasonable to assume that no corrosion allowance would be required. The 6 m width of the tank sides is selected because normal frame spacing for a ship of this size could be conveniently arranged to ensure that at least one transverse frame is aligned to support the loads that would be imposed on the cargo hold bulkheads by the pressurized cargo tanks.

The dimensions of the tank cross-section are set such that LS/RC ratio ensures balance between longitudinal and hoop stresses in determination of the required wall thickness for service when fully supported according to the design approach of this invention (as clarified in the previous example). To be accurate in assessing how the mid-body will deform if internal pressure is applied when the tank is not secured in the hold, it is likely that the professional designer would want to build and analyze an accurate Finite Element Analysis model. However, the length of the tank is approaching that where the stiffness of the end closures will have little effect on the deflections of the wall at the mid-body cross-section, so some simple evaluations will clarify the potential extremes of outward displacement that may occur.

The absolute maximum that these tank walls could deflect outward without risk of rupture would be the equivalent of about 20 wall thicknesses at the center of the span between two corners, including some allowance for elastic expansion of the steel skin due to hoop stress. This estimate can be made by assuming that the tank corners have essentially no resistance to opening beyond the design radius of curvature such that the squared section bloats to a fully circular form. If a tank were configured with LS/RC ratios at a value of about 3.0 or 10.0, then the change to a fully circular form would push the walls outward by about 15 or 35 wall thicknesses, respectively. However, it is more accurate to assume that the corners do have some rigidity, such that they will maintain the appearance of corners and will restrain the outward deflection by the reactions of tension and bending. If corners have this expected rigidity, then the outward deflection of the wall would be between about 1.5 to about 2.5 wall thicknesses if exposed to an internal pressure at about 10% of the normal operating pressure and between about two to about five wall thicknesses if exposed to an internal pressure at about 15-20% of the normal operating pressure.

These relative displacement values would apply for tanks of much larger or smaller size as long as the other parameters (such as the LS/RC ratio) are kept in the same proportion as assumed for this maritime case. Materials of different elastic properties will allow deflections that vary from those presented in the above example (i.e., aluminum or titanium tanks would allow substantially higher elastic expansion than steel without risk of rupture).

Turning now to FIGS. 4a and 4b, once the principles for designing the container for application with the rigid square shaft is appreciated, one skilled in the art will also recognize that the square cross-section of the shaft can be replaced by any secondary containment with a reinforced frame, such as a standard 8 ft by 8 ft by 40 ft long ISO container box which can be placed on a barge, a ship, a railcar, or a truck trailer. FIG. 4a is a schematic elevation showing a single fluid cargo tank 40 carried within a sealed structural frame 42 shown as a cross-section of an ISO container on a trailer 44, where the design case is directly analogous to the vertical shaft case described above. FIG. 4b is a schematic elevation showing four tanks 46a, 46b, 46c and 46d in a similar ISO container box 42a for transport of a cargo fluid on a truck 44a. In this case, the storage pressure P can be made essentially equal in all four tanks by connecting them to a common manifold. The reinforced shell of the ISO container box supports the outside side panels of tanks 46a, 46b, 46c and 46d along the internal periphery of the ISO container box. Inside side panels of tanks 46a, 46b, 46c and 46d press against the inside side panel of an adjacent tank. While hydrostatic and dynamic effects may cause some slight deflections, the contact surfaces between the four tanks 46a, 46b, 46c and 46d remain essentially flattened against each other, balancing the loads caused by the internal pressure P. The corner radius of tanks 40, 46a, 46b, 46c and 46d is determined as described in the preceding paragraphs.

Coatings or sheets of low friction materials (such as Teflon™ or Ultra-High Molecular Weight plastics) may be permanently placed between the pressure loaded contact surfaces to minimize any tendency for abrasion between differentially deflecting or displacing surfaces of containers or surrounding structures during transport or cargo handing operations. This practice for limiting the potential for abrasive wall thinning may be applied in fixed storage facilities as well as on land or marine transports. One may use a material that serves the combined purpose of preventing abrasion and providing insulation between cargo tanks and surrounding bulkheads of a cargo hold, where the insulation can withstand the compressive forces that are present when the cargo tanks are full.

It is important that the ISO container boxes 42 and 42a be properly insulated to ensure that the cargo does not warm so rapidly that undesirable quantities of cargo fluid are vented away during transport and/or storage. Even if the ISO box is fitted with refrigeration equipment, it is still important to use a container that provides adequate insulating properties, as well as structural support for tanks 40 and 46. ISO container boxes 42 and 42a may have sealed structural walls that are relatively thicker than typical dry bulk ISO boxes. The sealed structural walls may have an inner sealing surface and an outer sealing surface spaced apart from the inner surface so that a space is defined between the inner and outer sealing surfaces. The space defined between the inner and outer sealing surfaces may be evacuated to a very low pressure. Maintaining a vacuum across that space will either complement whatever additional insulating layers are applied to the internal and/or external surfaces of the box or avoid the necessity for additional insulation entirely.

The structural design efficiency of the ISO box 42a, which contains the four tanks shown in FIG. 4b, can be improved if the cross-section is partitioned into quadrants (each containing a tank) by tension load bearing structural panels running vertically and horizontally. Such tension elements (running as a cruciform essentially the length of the ISO box) will cut the side spans for the side panels of the ISO box in half. This will substantially reduce the structural strength and rigidity requirements of the box side framing.

On a ship, vertically-oriented tanks would likely be restricted to heights below about 40 m. The volume per vertical tank would be held to about 1.0e6 scm (~35e6 scf) and 1.8e6 scm (~64e6 scf), respectively, for the noted storage conditions and tank cross-sectional dimensions given for the two in ground "mined shaft" storage cases noted above in connection with FIG. 3c. Although these are much smaller volumes per tank than could be contemplated for storage in a land-based shaft, the anticipated volumes are much greater than the capacities envisioned for prior art individual, pressurized natural gas tanks. Therefore, the number of tanks needed for a ship of a specified capacity and the extent and cost of interconnecting piping, valves, and controls will be greatly reduced.

Figure 5B:
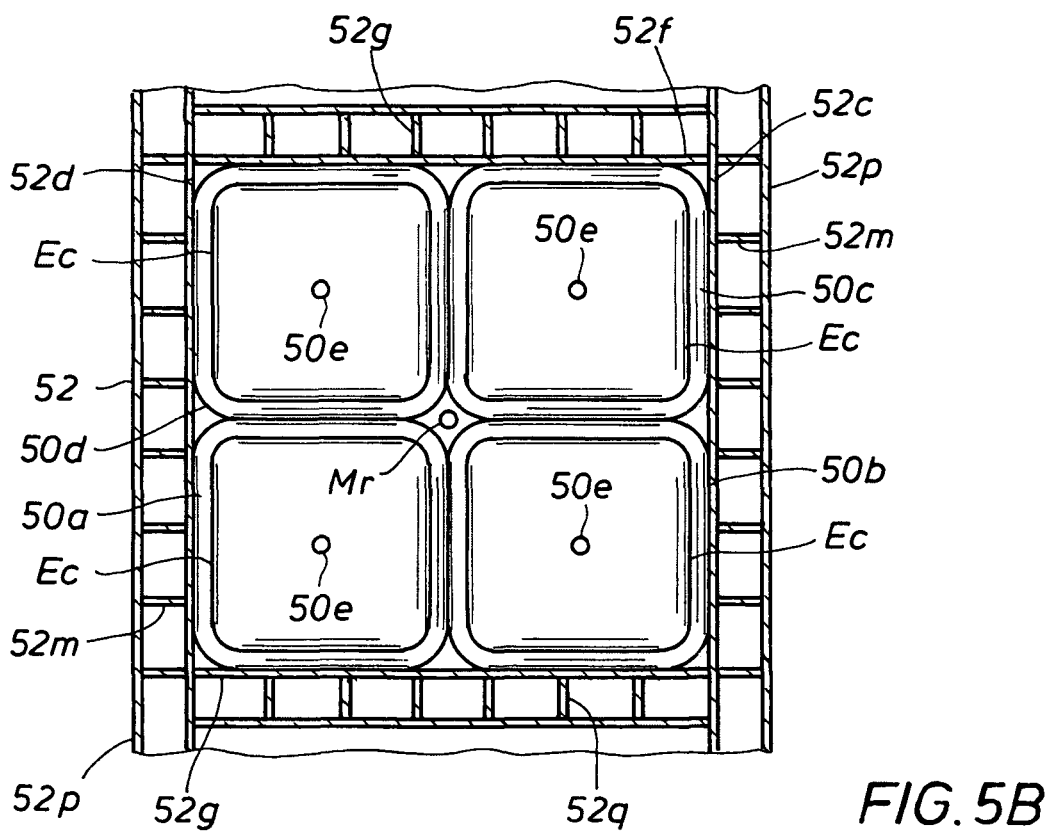
FIG. 5b is a schematic diagram of a plan view of the ship's hold of FIG. 5a and shows four filled containers occupying over 90% of the cargo hold plan area.

FIG. 5a is an elevation showing two empty cargo containers 50a and 50b disposed in a cross-section of a ship's hull 52. A hold space 52a is defined and enclosed by a deck 52b, longitudinal wing bulkheads 52c and 52d, and bottom horizontal plating 52e. FIG. 5b is a top plan view of the hold space 52a showing the two cargo containers 50a and 50b seen in FIG. 5a and two more cargo containers 50c and 50d are located in hold space 52a. Transverse bulkheads 52f and 52g further define hold space 52a. The four containers 50a, 50b, 50c and 50d are surrounded by the longitudinal wing bulkheads 52c and 52d and the transverse bulkheads 52f and 52g in the typical hold space 52a of a ship. In FIG. 5b, containers 50a, 50b, 50c and 50d are shown in plan view as fully pressurized with cargo such that their relatively soft sides are expanded to contact each other and the longitudinal wing bulkheads 52c and 52d and the transverse bulkheads 52f and 52g that form the sides of the cargo hold space 52a. Containers 50a, 50b, 50c and 50d comprise walls W between end closures EC. Supports 54a and 54b are optional, but may be used to stabilize the containers 50 within the hold space 52a and to secure the containers 50 to the ship's structural components. If such support structures do exist (as shown on the left side of FIG. 5a), they can be placed in ways that ensure there is adequate clearance for a bottom piping manifold Mb and inspection access around the perimeters of the containers 50. A top piping manifold Mt with valves Mv provides fluid access to the top of the containers 50a, 50b, 50c and 50d. Piping manifold riser Mr represents a vertical riser pipe flow path connected to the bottom piping manifold Mb for conveying fluids to/from the bottom connections of all four containers in a hold.

Alternatively, since the containers of this invention are large enough to make internal access practical so that peripheral clearance for external access may not be required, internal risers Mi may be secured to low spots within each container to allow bottom-side draining or filling (as shown in the tank 50b on the right side of FIG. 5a). In either piping arrangement just described, the piping from each tank will be connected to a piping system with appropriate valves above the deck of the ship. Such piping and closing devices will be designed according to appropriate codes (for example, ASME Piping Codes B31.3 and B31.8) and should be located above the main deck as per maritime practice reflected in the American Bureau of Shipping's (ABS) Steel Vessel Rules and the ABS Guide for Vessels Intended to Carry Compressed Natural Gases in Bulk (published 2005).

FIG. 5b shows how four squared-section tanks 50a, 50b, 50c and 50d placed in a ship's hold would be supported by the ship's structures framing the bulkheads at the periphery of the hold while their contact with adjacent tanks will provide the balancing support of contact as just described for the four tanks within an ISO box (FIG. 4b), as long as all four tanks are maintained at equal pressure. In such an arrangement, it is important to ensure that all four tanks are nearly always at nearly equal pressure. So, it is recommended that no valves or other closing devices be placed on the flow paths of the interconnecting topside piping that could inadvertently cause a substantial pressure imbalance. Also in FIG. 5b, topside nozzles 50e are shown as centered on the end closures EC for each of the four containers 50a, 50b, 50c and 50d, and the external riser Mr, as would come from the bottom piping manifold Mb shown on the left in FIG. 5a, is shown as centered between the four containers.

While it is likely that interior surfaces of the bulkheads and decks surrounding the tanks in FIGS. 5a and 5b will be coated with insulating materials (and therefore, not likely to ever be in direct contact with the tanks), it is important that the layer of insulation and the bulkheads be able to resist the pressure loads from the cargo tanks. Professional naval architects will be readily familiar with the design practice to address the vertical loading imposed by the tanks described in this invention. In addition to the primary hull girder loadings imposed by ocean operations, the inner bottom plating 52e must combine with a bottom shell plate 52h and structural framing in an inner bottom tank space 52i, which is between the inner bottom plating 52e and the bottom shell plate 52h, to carry the secondary and tertiary loadings imposed by the weights of the tanks in the hold and any cargo contained therein. It is likely that a transverse frame structure 52j (FIG. 5a) supporting the main deck 52b will only pick up loads from the cargo tanks if there are structural connections 54a between it and the cargo tanks.

While it would be unusual to see cargo fluids imposing horizontal pressure loads much above those corresponding to liquids pressured at about 1 bara acting on the primary vertical bulkhead structures of ships, the professional naval architect will appreciate how to design framing structures 52*m* (FIG. 5*b*) in wing spaces 52*n* (FIG. 5*a*) to work in concert with longitudinal wing bulkheads 52*c* and 52*d* and the side shell of the ship 52*p* to accommodate the pressure induced loads imposed by tanks 50*a*, 50*b*, 50*c* and 50*d*. As shown in FIG. 5*b*, structural framing 52*q* that would run longitudinally between the transverse bulkheads of adjacent holds could be designed in a similar way by those familiar with the art to support the relatively high pressure loads as well as all the normal loads imposed by the marine environment.

It is worth noting that the large cargo containers shown in FIG. 5*b* occupy more than 90% of the available cargo space within the holds of the ship's hull 52. Typical prior art CNG cylinders are too small (as compared to these large cargo containers) to allow internal access for inspection. Therefore, if adequate inspection access is provided around each of the typical prior art CNG cylinders according to maritime standards (ref. ABS Steel Vessel Rules), the prior art CNG cargo cylinders will be restricted to occupying less than about 50% of the cargo hold area. Thus, the present invention allows use of about 90% of the available cargo space in a ship's holds as compared to about 50% utilization in the prior art, which is a very substantial increase in utilization of the ship's available cargo space.

Friction between the membrane panel and the wall supporting it will tend to reduce the tensile stress in the transverse direction through shear. Therefore, if the effective "hoop stress" is controlling, then the thickness of the skin may be progressively reduced toward the center of the panel to a minimum at the center of the panel. The degree of wall thickness reduction due to this effect depends on the friction coefficient between the two materials and how safety standards (such as those overseen by ASME) would recognize any such allowance, as well as confirmation that longitudinal loads are being properly accommodated. Such a design consideration may provide a path to some additional tank weight reduction if further weight reduction is critical.

While in the cases discussed in the preceding, the walls of the wall-sided tanks are generally assumed to be parallel, it is possible to have the walls of a tank sloping relative to each other (while maintaining an essentially constant rectilinear form on a plane cut normal to the primary longitudinal axis of the tank) if the surrounding structural walls are disposed with a corresponding slope. Such a feature may be desirable in the most forward or aft holds of a ship. On a ship, it is likely that all tank walls running transversely will be vertically oriented, and the tanks at the center of the hold will all have parallel walls, while the walls of the outermost tanks will be designed with a slope to match with any flare of the hull and bulkheads in those locations.

Designers might readily consider other situations where it will be important to adopt sloping wall configurations for the tanks. For example, large tanks placed in the earth may adopt a sloping configuration for the walls such that the bottom of the tank will have a much larger area than the top. Having such a truncated pyramid shape may be expected to provide some security advantages in that, for example, the smaller top has less exposure at the surface and the bearing load of the earth (e.g., soils and/or rock) filled on top of the sloping walls of the tank can be increased to support higher internal pressures by piling up the height of this fill well above the surface of the earth. However, having the inverse configuration (with the larger area at the top) may be easier and cheaper to install and secure in the earth because it would involve a smaller excavation. The "upside-down" truncated pyramid would also make it easier to drain liquids (or other dense fluids) from the bottom side through the dip tube because the bottom of the tank could be very small compared to the top, and the sides could be sloped enough to ease human access for internal inspection.

Tanks according to the present invention can be designed to survive a situation where external support is lost while the tank is carrying cargo at operating pressure, in which case the tank walls may yield, but they should be designed not to rupture. The tanks do not depend on external structures for support when not pressurized, as they are substantially self-supporting for handling and installation after manufacture, although it may be desirable to provide some bracing and/or to pressurize the tanks slightly for additional stability during installation. Contact with external side supporting walls only occurs when internal pressure is applied and such support becomes useful and necessary. The tanks can be safely separated from external surrounding supports by removing internal pressure from the tanks and/or by increasing external pressure outside the tanks above the pressure inside the tanks. While the tanks are described as requiring external support while under the specified normal operating pressure, the tank walls may not deflect so much as to require external support in all cases.

Turning now to fabrication of containers according to the present invention, in one embodiment the polygonal (e.g., squared) containers may comprise a body that has a composite wall, where a thin, relatively weak sealing liner has multiple layers of reinforcing sheets laid over and bonded to it such that the resultant shell of the body will be strong enough to safely contain the design pressure and loads. The resultant shell of the body may be relatively rigid or so flexible that a modest internal pressurization may be required to enable safe handling and installation. In either case, suitable transition segments must be incorporated in the container between the rigid end closures (e.g., heavy steel end caps and nozzles) and the relatively more flexible body shell.

It is also possible that the hybrid composite cargo container, using bonded layers of reinforcing sheets to build up the targeted design strength, could have a fully circular shell body and have a strength and rigidity sufficient to allow it to stand independently as a competent cargo container. In other words, a circular cylinder cargo container that starts with an extremely thin metallic inner liner can have a very robust and rigid resultant body shell whose rigidity is comparable to that of its end closures. Whether the container is rectangular or a circular cylindrical shape in the body, the use of a modest internal pressure to ensure stability of the form during application of the reinforcing layers allows the fabrication of containers of very great dimensions as compared to a typical steel pipe body cylinder. This statement can be clarified by comparison to the pure fiber-wrapped composite pressure vessels produced by Lincoln Composites of Omaha, Nebr. and noted by Campbell in U.S. Pat. No. 6,339,996 or the hybrid steel pressure vessels reinforced by fiber-wrapped composites described by Fawley in U.S. Pat. No. 6,779,565. Due to the fact that fibers are being wrapped around a plastic liner that is supported by a rigid mandrel inside Campbell's composite tanks or around the rigid steel pipe pressure vessel proposed by Fawley, the container size is substantially limited as compared to this invention where large sheets of reinforcing and/or sealing material are wrapped around the inner sealing layer. Fawley's technology is licensed to FPC Inc. in New Brunswick, Canada for production of Gas Transport Modules™ (GTM) that are limited to diameters of about 42" and lengths of about 12 m for land and potentially up to 24 m for marine applications. Campbell's TransOcean Gas Corp. of St. John's, Newfoundland and the potential suppliers of such pressure vessels have acknowledged that the pure composite cylinders are limited to a similar diameter and lengths of less than about 12 m. The dynamics of the quickly moving (spinning) components involved in the process of making very many wraps of fibers according to their methods limits the sizes of the vessels they are attempting to produce. The careful laying on and bonding of sheets of very large area (possibly made up of multiple segments bonded to each other along seams) faces none of these dynamic problems. So, the container being enclosed in and supported by these layers of material can be many times larger than the cylinders described by Campbell or Fawley. It is reasonable to conceive these containers being between 30 to 100 m long with typical mid-body dimensions of 2 to 10 m.

With reference to FIG. 6a, the fabrication approach described in the preceding paragraphs can be used to make a circular cylinder 60 that does not necessarily have an essentially rigid cross-section. Cylinder 60 can be rigid or can have side walls that collapse relatively easily if the cylinder is not adequately supported by internal or external supports or internal pressure adequate to maintain the designed cylindrical shape. As shown in FIG. 6b, cylinder 60 has an internal sealing layer 62 that prevents egress of the cargo fluids from the internal cavity. Multiple layers of membrane sheet material(s) 64 are laid over and bonded to (e.g., glued around) the thin sealing inner liner 62 to ensure adequate composite membrane strength to resist the internal pressures needed to store commercial quantities of cargo within cylinder 60.

The inner liner 62 may comprise one or more layers of metal sheets or metallicized plastic sheets that are bonded together to ensure the inner seal. Parts of the cylindrical container 60 that are not covered with the reinforcing layers 64, such as the end closures 66a and 66b or nozzle bossings should be designed and constructed of materials to be independently strong enough to withstand the design internal pressures and any additional loads that relate to deployment and use of the cylinder 60 for cargo storage and transport. Suitable transitions in strength development should be configured between the relatively weak liner 62 that is fully reinforced by the built-up layers 64 and the parts of the end closures 66a and 66b that are designed to withstand the service loads without any reinforcement.

Turning to FIGS. 6c through 6f, a cylinder body fabrication process is described according to the present invention. The liner 62 may be so thin that internal pressure must support it during wrapping and bonding of external layers 64 (as opposed to using an internal mandrel method that limits diameter and length of cylinder). The use of an internal pressure $P_f$ during fabrication instead of a fixed mandrel to keep the desired circular shape makes it possible to make a laid-up multi-layer container of very great size (diameter and/or length). The resultant structure of multiple membrane layers may provide enough strength to hold a desired form of the container when the container is not affixed in or to supporting structures for handling or during cargo operations; or a slight internal pressurization may be required to help the container maintain the desired shape during handling and/or installation.

In FIGS. 6c-6f, the sealing liner 62 is pressured up by internal pressure $P_f$ to maintain a proper cylindrical shape while reinforcing membrane layers 64a and 64b are laid over and bonded in place to form the external layers 64. FIG. 6d shows a reinforcing membrane layer 64a being wrapped around the sealing layer 62 while the internal pressure $P_f$ provides an outward force for maintaining the proper cylindrical shape. FIG. 6e shows another reinforcing membrane layer 64b being wrapped around a composite cylinder 60a that is comprised of the sealing layer 62 and all previously laid up layers of reinforcing membranes while the internal pressure $P_f$ is still being maintained. In FIG. 6f, the internal pressure $P_f$ is maintained while the curing of the bonds of all layers of the reinforcement 64 takes place to ensure that the container 60 is ready for handling and installation. FIGS. 6c-6f depict a cylinder being made that has a circular cross-section, but the cross-section of the cylinder can have any desired shape including the rectangular or square cross-section of tank 10 in FIG. 1b.

Materials of the membrane layers should have strength, elasticity, ductility, and thermal expansion coefficient properties that optimize the distribution of stresses and deformations to ensure integrity of the structure under all operating and upset conditions that could reasonably occur in service.

Auto-frettage may be employed to optimize distribution of stresses between dissimilar materials of liner and membrane layers under pressures expected during operations. It is also possible to lower the temperature of a metallic liner (e.g., aluminum) well below the planned operating temperature to shrink its dimensions before tightly wrapping the layers onto it. Thus, when its temperature is raised to the normal range, the liner could be under a desired level of pre-compression such that, when pressurized during service, the wall stresses of the liner can be kept within an allowable range. Alternatively, if the reinforcing membrane layers are materials that shrink when heated or exposed to some form of electromagnetic radiation (e.g. ultraviolet light), it would be possible to develop compressive pre-stressing in the sealing liner by heating the composite container or exposing it to a specified type and amount of electromagnetic radiation.

While the preceding has discussed methods to fabricate tanks of great size, it is worth noting that the concept of using sheets of material to build up a reinforcing structural layer to create a highly competent pressure vessel from a relatively weak foundation (i.e., the thin sealing membrane layer) can be applied as a means to strengthen a more sturdy squared tank or a cylindrical tank of traditional dimensions (as noted for the prior art) to gain an increase in its pressure duty capacity rating. Bonded layers of reinforcing sheets of high strength materials can increase a pressure vessel's toughness with regard to leaking and/or rupturing situations. The laying on and bonding of sheets of reinforcing materials provides a distinct alternative to the high speed process of spinning the fine fibers that comprise the reinforcing in hybrid and composite vessels of prior art. Large sheets of material may be laid out longitudinally along the tank body prior to wrapping them around the cylindrical or squared tanks. However, it is also possible to consider wrapping and bonding relatively narrow strips of high strength membrane material or even bands of fibers about 5 mm to 500 mm wide around polygonal tanks in a nearly circumferential orientation to build up the necessary strength of the resultant hybrid or composite pressure vessel in a manner similar to the way Fawley describes the creation of hybrid cylindrical tank with resin impregnated fibers. The polygonal hybrid tank (e.g., a squared cross-section tank) built up by nearly circumferential wrapping of the strips or bands of material may have a sturdy inner core sealing layer as a base or a thin inner sealing layer that depends on internal pressure to stably maintain its preferred shape during the wrapping and bonding and/or curing process.

Turning now to FIGS. 7a-7c, in another embodiment, an inner, sealing layer is not bonded to surrounding layers and is designed to collapse inwardly, away from the surrounding layers when a second fluid, preferably non-freezing liquid or an inert gas (e.g., nitrogen or $CO_2$) is injected into the annular space between them. FIG. 7a is an elevation in partial cross-section of a double skin container 70 being charged with cargo 72 through a piping system 74 that includes an open valve 74a and a nozzle 74b. Container 70 comprises an outer shell 70a that provides secondary containment and an inner sealing layer 70b. An annular cavity 70c is defined between an inside surface of outer shell 70a and an outer surface of inner sealing layer 70b. Annular cavity 70c is preferably filled with an inert fluid, such as nitrogen, that would be displaced through a piping connection nozzle 74c and an open valve 74d. When fully charged with cargo 72, the sealing liner 70b will be pressed tight against the inner surface of the structural shell 70a of the container 70. The structural shell 70a may be any form (e.g., a circular cylinder) that conveniently supports the inner sealing layer 70b without inducing undesirable stresses or friction due to contact when the inner layer is expanded and pressurized against the inner surface of shell 70a. Structural shell 70a should be designed to support the inner sealing layer 70b against rupture from the cargo charging pressures and temperatures. Structural shell 70a should also protect the sealing layer 70b from loads and contact from external sources.

FIG. 7b is also an elevation in partial cross-section of container 70 and shows the initial stage of a cargo discharging operation. Inner sealing liner 70b is collapsing inwardly away from the secondary containment shell 70a as relatively higher pressure cargo fluid 72a is being discharged through piping connection nozzle 74b and open valve 74a to relatively lower pressure cargo receiving infrastructure (not shown) under a simple blow-down operation. With reference to FIG. 7c, to prevent the rate of discharge of cargo from decreasing as the pressure of the cargo remaining within the primary container 70b approaches the back-pressure of the cargo receiving infrastructure, a second fluid 76 (e.g., a pressurized inert gas) can be injected into the annular space 70c through valve 74d and nozzle 74c causing the flexible inner sealing liner 70b to fully collapse and discharge the highly valued fluid cargo 72 as one means for unloading cargo 72 from container 70. In this scheme, it may be necessary to provide a second sealing layer 70d bonded to the inner surface of the secondary containment shell 70a. This containment concept and method for cargo discharging provides a means for minimizing the quantity of residual cargo fluid/gas that could not be sold but remains within the cargo containment system on a return voyage as "permanent heel" and/or as fuel for the ship. While it is likely that some residual cargo gas could be desirably used as fuel for the return trip, any amount of residual cargo that would not be designated for this use imposes an economic penalty on the system.

The fluid 76 injected into the annular space 70c can be a gas or liquid that is valued at the source location of the original cargo 72 (or a different location) such that the second fluid 76 may be exported from the location where the original fluid cargo 72 was discharged as a commercial enhancement to the transport operation. For example, if there was an oil field reservoir at the source of the original cargo 72 in which carbon dioxide was being injected to enhance recovery, known as CO2 flooding, and industry was producing large quantities of CO2 at the location where the original cargo 72 was being delivered, one can load that CO2 at the market location as fluid 76 and deliver it to the oil field for injection into the reservoir. The operators of the oil field would value the CO2 and the industry that was producing the CO2 would likely see value in the opportunity to sell the CO2.

The pressure and temperature of the fluid within the annulus can also be used to manage the pressure, temperature, and state of cargo being injected to the internal cavity during loading operations by managing the way in which the annulus fluid is being driven from the containment. By pre-charging the annulus 70c of the container 70 with an inert fluid at an appropriate pressure and temperature and controlling the rate at which it is displaced from the container 70 as cold pressurized cargo is being injected into the primary container 70b, it is possible to ensure that the cargo within the primary container 70b stays at a constant targeted pressure and temperature (or within a specified range of conditions) throughout the cargo loading operation. If any components of the cargo containment system (for example, the expandable bladder 70b itself) were in danger of becoming brittle at temperatures substantially below the targeted operating temperature, then it would be desirable to maintain a back pressure within the container receiving a charge of cargo to control the minimum temperature that the Joules-Thompson effect would tend to produce during charging.

Alternatively, the primary cargo may be carried in the annular cavity 70c with the displacement fluid being injected into the innermost cavity 70b to force discharge of the primary cargo from the annular cavity 70c.

Flexible and Collapsible Membrane Cargo Container Tubes

In U.S. Pat. Nos. 5,603,360; 5,676,180; 5,908,141; and 6,427,729, issued to Teel and collectively referred to as "Teel" herein, the inventor describes a CNG containment and handling system in which flexible bladders placed within pressure vessels allow the use of a hydraulic fluid to be injected into the annulus space between the surrounding pressure vessel and the bladder as a means to discharge CNG from the combined container. Teel's bladders are not intended to support any substantial pressure difference across the membranes. Further, while Teel's method allows essentially all of the CNG to be discharged from the bladder, he does not clarify how the hydraulic fluid can be recovered from the pressure vessel once the gas has been discharged. The invention regarding storage, transport, and delivery of CNG fuel specifies that after the CNG has been discharged from the pressure vessels into a storage facility at the vehicular fueling station, the hydraulic fluid is recovered from the pressure vessels. According to Teel, since the hydraulic fluid is used only at the delivery point, it appears impractical for the transporter to carry large volumes of heavy hydraulic fluid back and forth over the delivery route. Therefore, Teel has indicated the placement of a hydraulic reservoir at the delivery point to assist in discharge. Teel's concept is intended to support ambient temperature operations and avoid the occurrence of low temperatures by including heaters in the loading system flow path. Further, Teel's transporter is still carrying very heavy steel cylinder pressure vessels due to the fact that the internal bladder is not competent to contain the pressured CNG cargo. It would be much preferred to find a way to use lower storage pressures and gas as a displacement fluid as will be described below.

Turning to FIGS. 8a-8e, an alternative scheme allows for use of multiple collapsible containers with desired pressure containment competency within a structurally rigid, sealed secondary containment enclosure. For example, a number of collapsible tubes may be arranged within an ISO trucking container box. The tubes are designed to expand and nearly fill the space when loaded with pressurized cargo as shown in FIG. 4b with the stresses in the primary sealing containers managed according to the principles discussed above and according to the specified storage temperature and pressure conditions. However, the conformable/collapsible inner sealing containers may be designed to expand only to the extent that their skin reaches a full circular cross-section without imposing significant pressure loads on the surrounding box structures. Some contact with the box container walls may be practiced and allowed as clarified earlier. The skin and structure of the secondary containment could then be designed to withstand a substantially lower pressure. For example, the primary containers may be designed to withstand 100 bar internal pressure while the secondary containment may be limited to only 20 bar. Cargo discharge can be completed by allowing the primary containers to blow down to the point where scavenging compression is needed to overcome backpressure from the receiving infrastructure (usually 30-50 bar). Then, scavenging can draw the residual pressure down to about 15 bar when a displacement fluid (probably an inert gas) is injected at a pressure between 15 to 20 bar into the space enclosed by the secondary containment at a pressure that will collapse the primary containers to drive out most of the residual cargo fluid without requiring any deeper compression ratios for the scavenging compression. This containment design concept and unloading scheme are further described below.

FIG. 8a is a side elevation in partial cross-section of a container system 80 that comprises an insulated and structurally reinforced ISO container box 82 and flexible membrane cargo container tubes 84a and 84b. Flexible membrane cargo container tubes 84a and 84b are fully charged and at a storage pressure P. FIG. 8b is a cross-section of container system 80 as seen along the line 8b-8b in FIG. 8a. As can be seen in FIG. 8b, there are four flexible membrane cargo container tubes 84a, 84b, 84c and 84d, which are referred to generally as tubes 84. When at storage pressure P, cargo container tubes 84 have a side profile of an elongated oval and a three-dimensional shape of a tapered cylinder, which is often referred to as a cigar shape. Cargo container tubes 84a, 84b, 84c and 84d are interconnected through manifold piping 86 with internal pressure maintained or controlled by a valve 86a. An annular space 83 is defined between an inside surface of ISO container box 82 and an outside surface of cargo container tubes 84. Annular space 83 is filled with a cold, inert gas (e.g., nitrogen) that can be introduced into annular space 83 through a valve 86b. A refrigeration unit (not shown) may be fitted to the ISO container box 82 to maintain the internal temperature at a desired subzero value. Another means of maintaining a targeted internal temperature is to fit a small reservoir of liquid nitrogen (not shown) onto ISO container box 82 to feed in a stream of very cold nitrogen gas at a rate controlled to offset any heat gain from the ambient environment and/or any leakage of the blanketing gas from the ISO container box 82.

FIG. 8c shows cargo 88 being discharged using a simple blow-down method in which valve 86a is opened to allow cargo 88 to flow from a relatively higher pressure inside cargo container tubes 84 to an infrastructure (not shown) that is at a relatively lower pressure. In FIG. 8d, a scavenging compressor 89 has been connected to the discharge flow path such that cargo 88 may continue to be discharged even though the pressure inside cargo container tubes 84 is approaching or dropping below the back pressure of the receiving infrastructure. In FIG. 8e, a secondary fluid 83a, such as cold nitrogen gas, is being injected through valve 86b into the annular space 83 surrounding the cargo container tubes 84 to maintain a targeted back pressure feeding scavenging compressor 89. ISO container box 82, which provides secondary containment, should be sealed adequately and designed to withstand the injection pressure of secondary fluid 83a required to maintain adequate back pressure to the scavenging compressor 89 and to collapse the cargo container tubes 84. The injection pressure for secondary fluid 83a should be substantially less than 1 MPa.

Since a relatively low pressure gas is being used as the displacement fluid to minimize scavenging costs rather than a heavy hydraulic fluid, it is practical to keep the displacement fluid in the annular space on the return trip back to the loading station. With the annular space filled with a pressurized fluid at the start of loading, it is possible to avoid the occurrence of extreme temperature drops due to the Joule-Thompson effect that could cause hydrate blockages or brittle fracture of the primary container. If the displacement gas is nitrogen it can simply be vented back at the loading terminal. The nitrogen can be stored under relatively high pressure that is slowly filled between truckload arrivals, so that a truckload discharging operation can be completed relatively quickly without requiring a high capacity compressor to keep up with the high flow rate. The nitrogen reservoir can be charged at a low rate. A designer may wish to consider means to take advantage of the cooling capacity of the gas being recovered. Further, the displacement gas could be a gas that has some value at or nearby the loading terminal, so it would be desirable to capture it and its value upon its recovery from the annular space.

Permanent storage can be established with a scheme similar to that described with reference to FIGS. 8a-8e but with longer and larger collapsible tanks secured in a deep mined, sealed, and reinforced shaft as noted previously in describing FIG. 3c. However, in this scenario, the collapsible tanks experience dramatic changes in cross-section during charging and discharging operations, whereas wall sides of the less flexible version of the squared tank secured in the mined shaft remain relatively close to the structurally rigid sides of the mined shaft and/or adjacent tanks secured within the mined shaft.

Temporary storage can be established by placing at a desired location one or more of the ISO container boxes 82 filled with a fluid to be stored. In such a scenario, ISO boxes that are filled with pressurized cargo can be dropped at various locations and retrieved when emptied to be replaced by fully charged cargo containers.

Coiled Containers in Carousels

Turning to FIGS. 9a and 9b, another embodiment of the present invention concerns use of the squared shape of the cargo container cross-section to increase the utilization of the space available for cargo containment as compared to a container comprising a cylindrical pipe coiled within a secondary structural containment referred to as a carousel or a carousel can, which is described in the Stenning patents. Stenning describes a very long single circular pipe of small diameter coiled tightly in layers and wraps to occupy the space available within a secondary containment carousel structure. These carousels may be stacked several units high within the cargo holds of a ship or on the deck of a barge.

However, the circular cross-section of the pipe in the carousels ensure that only a small fraction of hold space is filled with cargo. Space external to the big carousel cans is not filled with cargo containers because there must be space provided around the can to allow access for inspection within the holds of the ship. Further, there is an interstitial open space in between adjacent pipe sections in the carousel.

FIG. 9a is an elevation in cross-section of a carousel 90 according to the present invention. Carousel 90 comprises a long coiled tubular 92 having a generally squared cross-section. Coiled tubular 92 comprises a long tube, which is possibly several kilometers in length, coiled within a secondary containment carousel structure 94. A top plan view of carousel 90 is not shown but would comprise an outer circle for an outside edge of stiffened wall 94a of the secondary containment carousel structure 94 and an inner concentric circle for an inside edge of stiffened wall 94b of secondary containment carousel structure 94. FIG. 9a shows carousel 90 cut vertically through its center, which shows the square cross-section of the coils and layers of coiled tubular 92. The secondary containment carousel structure 94 is thus filled with layers and wraps of the squared tubular containment coil 92.

FIG. 9b is a side elevation in cross-section of carousel 90 without its full complement of coils and without a top panel of containment carousel structure 94. FIG. 9b shows how tubular 92 is coiled and layered in the secondary containment carousel structure 94. The first coil of tubular 92 is the lowest and innermost coil, which is labeled 92a. The horizontal arrows in FIGS. 9a and 9b indicate the laying direction of each layer of coiled tubular 92. The horizontal arrows thus show that the first and lowest layer of tubular 92 is formed by coiling the tubular 92 outwardly toward outside edge 94a of the secondary containment carousel structure 94. After the lowest and outermost coil 92b is wrapped, the vertical arrows indicate that a second layer is begun by wrapping the tubular 92 to form an outermost coil for the second layer immediately above the lowest and outermost coil 92b. The horizontal arrow on the second layer indicates the coils are formed inwardly toward the inside edge 94b of secondary containment carousel structure 94. When the coil in the second layer closest to the inside edge 94b is formed, the vertical arrows indicate a third layer is begun. The remaining coils and layers of coiled tubular 92 are formed similarly as indicated by the arrows in FIG. 9a. Flow paths allowing fluid to enter and exit the coil would be provided as piping connections at the top and the bottom within the spindle's center space.

Secondary containment carousel structure 94 includes a structurally reinforced inner sealing layer 96 that is supported by horizontal stiffener plates 98a and vertical stiffener plates 98b at an inner core or spindle at the inside edge 94b. The inner sealing layer 96 comprises an inner cylinder 96a, and outer cylinder 96b, a bottom plate 96c and a top plate 96d. Further support and reinforcement for inner sealing layer 96 is provided by outer stiffener plates 98c and bottom stiffener plates 98d. The vertical and horizontal stiffener plates form a grillage on all external surfaces of sealing layer 96 to efficiently support it against the pressure loads from the tubular inside the carousel.

Figure 10:
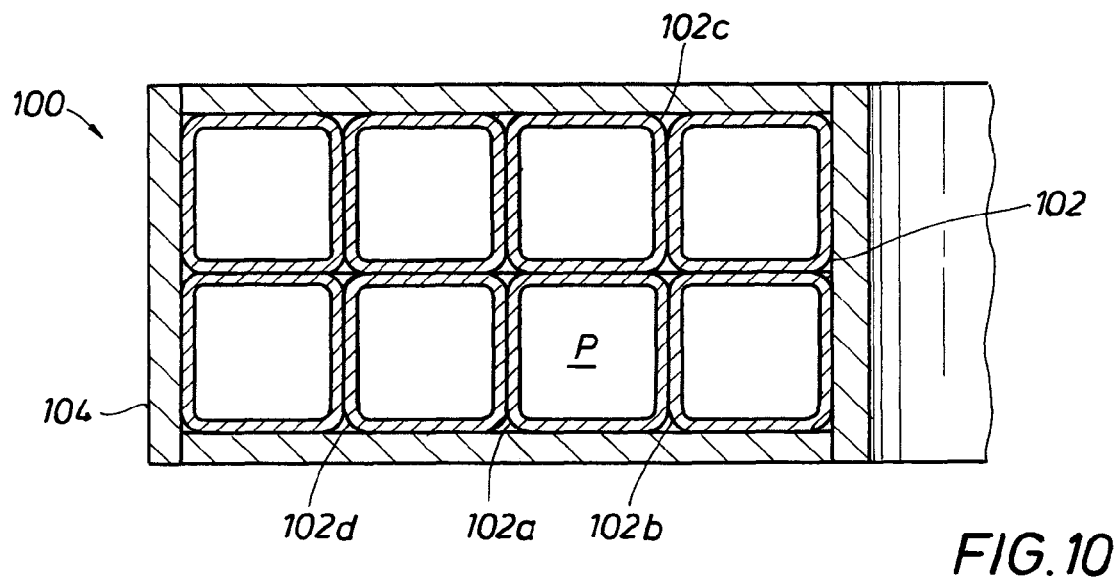
FIG. 10 is a schematic elevation in cross-section of the tubular cargo container of FIG. 9a showing how pressure loads within any tubular section are substantially balanced by the same pressure acting within adjacent tubular sections or the reaction force of the rigid shell of the carousel structure.

Since all of the tubular length within the coil is exposed to essentially the same internal pressure (excluding slight hydrostatic differences that exist from layer to layer), the faces of adjacent sections in the coil (i.e., adjacent wraps and layers) support each other as shown in FIG. 10. FIG. 10 is a greatly simplified cross-section of a portion of a carousel 100, which is similar to one half of the carousel 90 shown in FIGS. 9a and 9b. Carousel 100 includes a coiled tubular 102, which has a square cross section, within a containment structure 104. A cross-section 102a of the coiled tubular 102 is surrounded on three sides by adjacent cross-sections 102b, 102c and 102d of the same coiled tubular 102, and all the cross-sections are charged with pressure P. The sides of the adjacent tubular cross-sections 102b, 102c and 102d exert a pressure against the sides of section 102a such that the resultant forces balance each other except at the radiused corners, where there is no contacting surface to provide support. The inner surfaces of the structurally reinforced sealing panels of the carousel 100 provide the external constraint that balances the forces caused by P acting within the sections of the coil except at their corners. Those unsupported radii, $R_C$, develop an effective hoop stress as has already been discussed above.

Constraint provided by adjacent tubular cross-sections of adjacent layers and wraps in the coil and by the secondary containment carousel can structure 104 maintains stress distribution within the coil tubular 102 such that the wall of the squared tubular 102 does not have to be designed to restrain the pressure with strength in the manner that hoop stress must be carried by individual circular pipe cross-sections within the coiled containment system introduced in the Stenning patents. As a result, the ratio of cargo mass to container mass will be improved along with better utilization of the available cargo space.

In fact, whereas the Stenning patents describe the use of circular pipes of diameters substantially less than 200 mm, the dimension for each side of the squared tubulars 92 and 102 taught by this invention may be substantially larger with the corner radii restrained to values less than about 150 mm. Since the wall thickness can be controlled primarily by the selection of the corner radius, the tubulars 92 and 102 of this invention will have much greater cargo capacity per unit length for a wall thickness equal to the circular pipe described by Stenning. By using deep refrigeration and much lower pressures than considered by Stenning (for example, as the ranges of conditions noted by Secord), the mass ratio of cargo to container can be improved by about an order of magnitude.

It is believed that, according to a presentation by Stenning at a Newfoundland Ocean Industries Association (NOIA) Conference in 2006 at St. John's, Newfoundland, Canada, a typical Coselle™ carousel containing 16 kilometers (km) of 168 mm diameter pipe with 6 mm wall thickness will be approximately 3.3 m tall and have a 15-16 m outside diameter with a core/spindle diameter of about 6 m. The Coselle™ carousel will contain about 410 metric tonnes (410 mt) of steel pipe and 70 mt of gas. In contrast, a carousel can according to the present invention, which has the same external dimensions as the Coselle™ carousel, would be able to contain over 500 mt of Saharan gas (compared to 70 mt) at −57° C. and 6.9 MPa storage conditions in 460 mt of the squared tubular of this invention, based on a tubing length of approximately 13.6 km with a cross-sectional dimension of 400 mm by 400 mm on the sides and 100 mm radii at the corners with 3 mm thick walls (including a 0.5 mm corrosion allowance) using material of the same strength as used by Stenning.

Thus, the Coselle™ carousel requires 410 mt of container weight to carry 70 mt of gas. The present invention, using a carousel of the same external dimensions, can carry 500 mt of gas in a container weight of 460 mt. This application of cold, dense phase storage in squared tubulars gives a very efficient mass ratio of 1.11. This is a significant improvement over the Coselle™ carousel, which has a mass ratio of 70 mt/410 mt=0.171. A mass ratio of 1.11 compared to 0.171 is a 650 percent improvement. (The numbers for the Coselle™ carousel is also likely to include a corrosion allowance not considered in Bishop's assessment of storage efficiency).

The degree to which the side-walls of the squared tubular can be reduced also depends on the wall stability under the weight load of subsequent layers within the carousel. The number of layers in the coil may be constrained by this design consideration unless the lower layers have thickened walls to maintain stability.

The cross-section at the innermost and outermost wraps of the coils may be either squared with flattened walls on all four sides or flattened on at least one side with a circular arc or multi-arc shape, instead of a flat side on the side or sides not supported by adjacent wraps or layers of the coil. See U.S. Pat. No. 5,577,630, issued to Blair et al and incorporated by reference herein, which describes a composite conformable pressure vessel for use associated with vehicles. If these extreme wraps (innermost or outermost) are directly supported by a matching flat surface of the secondary containments supporting structure of the carousel, then the tubular may maintain a squared cross-section throughout the coil. However, the walls of the tubular defining the flow path at the entrance and exit of the coil should be carefully transitioned from the squared cross-section to the typical circular cross-section of shipboard piping. The wall of these transitioning pieces will have to be thickened according to engineering practice and as predicted by detailed finite element analysis to accommodate the loss of contact area and matching pressure support, as well as the details of constraint at those locations.

The radius of the quarter section arc at the four corners of the extruded tubular should be selected according to the thickness and strength of the material or materials being used and the pressures that are to be contained. Calculations for the relationship between the corner radii and the minimum wall thickness can follow the method taught with Eqns. 1 through 5 herein. However, with extruded tubular sections, it is likely that the material at the corners will be slightly thicker than required as a minimum based on the internal radius, $R_C$.

One variation from the method introduced in the Blair patent is that the surfaces of the carousel structures adjacent to the extreme (innermost and outermost) wraps of the coil can be close enough to the tubular to provide at least partial support against deflection of the outermost surface of the tubular forming these extreme wraps to a full arc. Such support can offer the opportunity to use reduced wall thickness locally in the tubular.

The top layer of wraps of the coil may be of the basic squared sections (except for the extreme wraps) if it is fully supported by a flat structural panel top of the carousel that is designed to resist the force from the internal pressure within the coiled tubular. The top panel may be designed with a thickness, material strength, and/or supporting structures adequate to provide the desired degree of constraint. Alternatively, weight, possibly just a weight load imposed by the bottom of the next higher carousel in a stack of carousels, may be distributed on that top panel as a means to constrain against deformations in the top layer of the coil that would tend to result from internal pressurization of the coil.

If the top layer is not constrained on its top surface in a way that would allow a fully squared section to be used on that layer, then either the details of the corners and membrane sides and the transitions between them should be designed to safely accommodate the deformations and stress distribution of the expanded cross-section or a combination of flat sides and multi-arc surfaces can be used to establish contact and downward reaction load distribution from the underside of the top surface adequate to stabilize the coil. However, as opposed to Blair's method, the topside surface of the tubular cross-section should at some point be in contact with a constraining surface of the carousel's top panel. This contact should provide enough vertical constraint to ensure that the bottom surface of the tubular on the top layer of the coil is constrained to maintain full contact and constraint against the layer of the coil immediately below it.

To address the range of expected design conditions for the cargo container, the cross-section and carousel details (especially the elements of the carousel that contact the coil) should be designed to constrain or accommodate the dimensional changes that tend to occur. Generally, when temperatures and/or pressures change, the cross-sections will attempt to expand except as constrained by adjacent elements. The length of the long tubular element will also tend to change which will cause adjacent layers and wraps of the coil to move against each other and against the interior surfaces of the carousel along the local primary length axis of the tubular.

Figure 11:
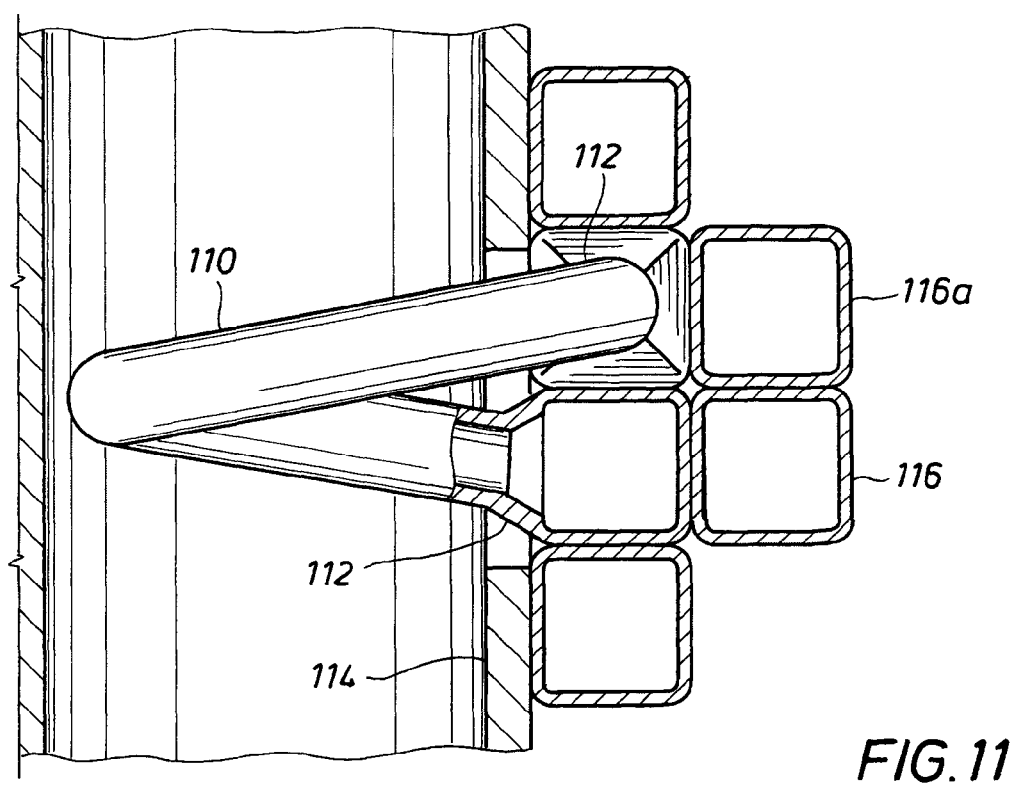

Turning to FIG. 11, some or all of the tendency for length changes can be accommodated at each layer of the coil by the design of the constraint on the extreme inner and outer wraps of the coil imposed by the carousel structures. Alternatively, a transition piece may be included at the inner core transition from one layer up to the adjacent layer such that the tendency for pressure and temperature-induced length changes for each layer are accommodated locally. As shown in FIG. 11, the transition piece may typically be a forged or welded component that includes both a typical piping expansion loop feature 110 and cross-sectional transitions 112 at each end to switch between the squared cross-section lying in the coil and the circular pipe cross-section that is provided throughout the expansion loop feature. The loop feature can be arranged to extend within the core of the carousel reel. The cross-sectional transition 112 crosses through an opening in a sealing barrier 114 of the central spindle into the interior space within the core as the flow path curls around to transition from one layer of the coiled tubular cross-sections 116, which is passing into the plane of the drawing sheet, up to the next layer 116a at the innermost wrap of the coil. It is expected that the interior space of the carousel or the stack of carousels will be a properly inerted and vented space.

A lubricant may be injected into the carousel or low friction material may be coated onto the tubular or placed separately in sheets between the layers to minimize the frictional wear or constraint between adjacent surfaces that move relatively due to changes in length of the coiled tubular container.

It can be expected that the low end flow path connection of the coiled tubular container can be constrained with relative fixity by imposing relatively little structural restraint due to the weight of the coil above it. However, it may be desirable to allow the top end path connection coming out of the top of the carousel to deflect to accommodate a substantial change in length. In such case, the connection to the main cargo piping headers may be designed to include a flexible pipe connection, as commonly used in the offshore industry (reference API Spec 17J for Non-bonded Flexible Pipe Design and Manufacture) or a length of metallic pipe configured as a relatively unconstrained expansion loop inserted between the cargo carousel and the piping run that joins to the main manifold header piping. Alternatively, both the bottom and the top end segments of the coil transitioning and exiting from the carousel can be constrained such that all deformation must be accommodated within the carousel can.

It is possible to manufacture the squared tubular of the coil to be composed of any one of a range of metals (e.g., aluminum, steel, or titanium alloys) or to be of a composite (multi-layered) cross-section as described for the flexible sided containers of this invention. A continuous extrusion process allows for the production and coiling of extremely long metallic tubular segments. While it is possible that girth welds can be employed to join discontinuous segments, a tubular of metallic cross-section may be extruded as a continuous, seamless component of such length that an entire coil is comprised of a single tubular extrusion. Materials used to form the skin or any bonds required in the cross-section or length of the tubular container should be suitable for the expected range of temperatures that can occur when in service.

For extruded tubular containers, the die that is used to extrude the long tube can be designed, manufactured, and controlled such that it can change the cross-section from squared to round to hybrid shape that is flat on at least one side and rounded on at least one side. The die should also be controlled such that the wall of the extrusion is thickened where needed to manage the resulting stresses that result from the reduced or missing support at the exterior surface of the extreme wraps (and possibly, the top layer) of the coil. The die may also be set or adjusted for extruding the tubular such that the exterior surface is formed in a way that adjacent wraps or layers will be preferentially disposed to align in a manner most advantageous for manufacturing the coiled cargo container. For example, in one embodiment extra material thickness may be provided at the corners such that raised ridges and recesses can be created on the cross-sections to guide the placement of adjacent wraps and/or layers. The appearance of these guiding features should be such that no undesirable local stress concentrations are created in the skin of the tubular during manufacture, assembly, or service.

Figure 12C:
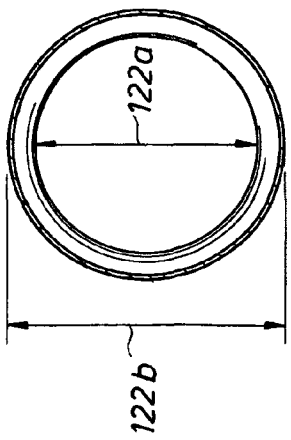
Figure 12B:
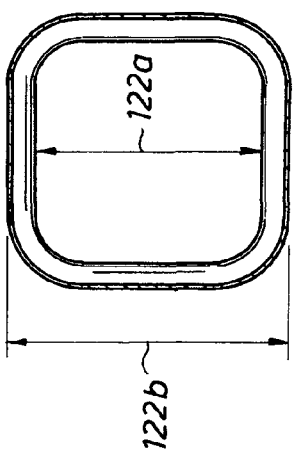
Figure 12A:
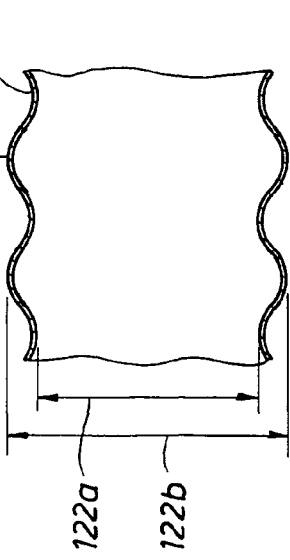
FIG. 12a is a schematic side elevation of a corrugated tubular cargo container, according to the present invention.

With reference to FIGS. 12a through 12c, by using a controllable die to allow a continuous extrusion process, a corrugation feature may be incorporated to form a corrugated tubular 120 for the purpose of simplifying the coiling process. FIG. 12a is a side elevation of corrugated tubular 120 showing this corrugation feature would have the inner and outer dimensions, 122a and 122b respectively, of the cross-section changing cyclically such that a wave form 122c of specified depth and wavelength 122d runs length-wise along the tubular as it is being formed. By introducing these corrugations into the tubular cross-section transverse to its longitudinal axis, it is possible to avoid any plastic deformations of the tubular as it is being coiled during placement in the carousel. The corrugations stabilize the walls against buckling collapse that could be induced by the weight of subsequent layers within a carousel and also provide local strengthening against internal pressure such that relatively thin walls can be maintained throughout even though the sides of the tubular may not be in continuous contact with the sides of adjacent tubulars or the sides of the carousel. A tubular having a circular cross-section can also be corrugated. FIG. 12b shows a cross-section of a corrugated tubular having a square cross-section, and FIG. 12c shows a cross-section of a corrugated tubular having a circular cross-section. Thus, a corrugated tubular for easy coiling within a carousel can be formed using either a tubular having a square or a circular cross-section. The corrugations may support a very thin wall design approach in square section tubulars by locally providing small radii of curvatures even if continuous contact with adjacent structures is not possible. However, it is recommended that the void space surrounding the tubulars within the carousels be filled with a light weight grout, an epoxy, or a resin-based short-fiber composite material that is compatible with the service temperatures to provide continuous support against internal pressure loads. If the corrugated tubular is to have a circular cross-section, then injection of supporting structural filler material will be required to allow a reduction of wall thickness compared to what would be required by normal hoop stress-dominated strength calculations.

The depth of the wave form 122c should be minimized to limit the tendency for liquids or particulate to accumulate within the coil. However, the coil can be purged periodically to eliminate undesirable accumulations within the coils.

One means for creating the coil within a carousel starts with the squared tubular being manufactured as an essentially straight element that is then deformed to the spiraling shape on each layer of the coil. If the section has a relatively constant cross-section (i.e., is not corrugated as introduced above), strains and plastic deformations at the extremes of the cross-section affected by the orientation of the deformation for coiling should be carefully managed and dimensions of the tubular cross-section should be selected to match the ability of the material being used to accommodate whatever minimum bending radius is required within the carousel.

As an alternative to extruding the cross-section in the form of a squared tubular, the squared form can be created by pulling or pushing a squared mandrel through and deforming the cross-section of round metal pipe. The sectional deforming process can be included as means to increase the yield strength of steel pipe material as is practiced in the pipe making industry to produce high strength "UOE" pipe (U'd, O'd, and Expanded pipe) by driving the mandrel through 40 foot (40 ft) or 60 ft (approximately, 12 m or 18 m respectively) joints of pipe.

Long straight lengths of pipe that were deformed in this way may then be coiled into the carousel by bending along the length to produce the spiraled shape on each layer. Alternatively, the mandrel that is passed through the pipe may also be used to cause the length-wise spiraling deformation. See U.S. Pat. No. 7,159,432, issued to Schüle and incorporated by reference.

The position of the contact surfaces of the mandrel that work/deform the shape of the tubular can be controlled by hydraulics such that the final deformed shape of any section is adjusted to match the local structural needs as the mandrel is passed through the tubular.

The manufacturing die can be controlled to cause a tubular being extruded to take on a form that has a continuously varying radius of curvature in the horizontal plane to naturally form a spiral on each layer of the coil. For an outward running layer, the radius of curvature is increased gradually with each progressive wrap, while the opposite is applied for wraps on an inwardly progressing layer.

Alternatively, the shape and orientation of an adjustable mandrel can be manipulated by internal hydraulics to support a continuous laying up and curing process for a composite or hybrid squared tubular such that a spiraling coil is produced layer by layer. The variation of the form of the mandrel and the laying up processes can be engineered and controlled to produce a cross-section with features similar to those noted for the extruded metallic tubular.

Another alternative to extruding the squared tubular cross-section would be to form the cross-section from a long, continuous band of thin metal sheet (e.g., rolled steel plate) around a square mandrel form as the metal band is unrolled from a large roll of the material. For example, a band of steel plate approximately 1.4 m to 1.5 m wide and 3 mm thick could be used to form the 400 mm by 400 mm square tube container with 100 mm radii at the four corners. As the edges of the sheet of metal band are pressed together around the mandrel, a long seam bond (e.g., a welded seam) can be used to close/seal the section. The mandrel can also be shaped and external pressing forms applied to impose corrugations to the walls of the tubular to gain the advantages for ease of placement within the carousel can as noted previously.

A scheme for manufacturing a completed coil within the secondary containment of a structural carousel can was described in one of the Stenning patents, U.S. Pat. No. 6,240,868, issued to Fitzpatrick et al., where the coils are comprised of small diameter rigid pipe. The present invention provides a more efficient method for coiling and for designing of the secondary containment carousel structure to support a coil comprised of an extruded tubular of squared cross-section.

The inner surfaces of the secondary containment structures (i.e., the carousel) are intended to form a sealing layer that can capture and direct any of the cargo fluids unexpectedly escaping from the coiled primary cargo container toward safe venting flow paths.

The carousel may be constructed of either metallic or composite materials or combinations of metallic and composite materials to form the sealing layers and supporting structural elements that establish a secondary containment feature. Since this invention considers that weight of the containment system should be minimized and that the materials of the containment system may operate at or be exposed to very low temperatures, a preferred embodiment would have the carousel constructed of composite materials. Another preferred embodiment would have the carousel manufactured as a hybrid construction of metallic and composite materials wherein the innermost surface is a sealing layer of metal.

The coiled tubular cargo container may have both upper and lower end piping connections such that cargo fluid and the displacement fluid can primarily be directed to enter and leave the container by way of the opposing connections.

It is intended that the coil will be established in essentially flat horizontal layers such that wraps of each layer spiral alternately outward and inward on adjacent layers as shown by the directional arrows in FIG. 9a. As opposed to circular pipe cross-sections in the coil, the squared tubular shape makes it practical to achieve the laying of flat, parallel layers. The transition from one layer of wraps to the next layer always occurs at the extreme (innermost and outermost) wraps where the transition is assisted by the structural arrangement and design of the carousel can.

At a point on the extreme wrap of each layer, a structural feature on the interior side of the outer boundary of the carousel will be incorporated to control the laying of the tubular, forcing it to rise up a gradual slope to the height of the next layer. The slope of this ramping feature changes along the length of the ramp to limit bending of the tubular to be within the allowable bending radius of the tubular on the pertinent axis so that the side walls will not buckle and the top and bottom surfaces will not be over-stressed. This structural feature should also guide the start of the inward spiraling of the outermost wrap on the layer that is established by the ramping up from the preceding layer. This structural feature is designed such that it fully constrains all sides of the tubular section on the extreme wrap where constraint is not provided by contact with sides of the tubular sections of adjacent wraps and layers. It may be impractical to fabricate these features of the secondary containment structure to maintain contact with the coiled tubular at the ends of each ramp up from one layer to the next, so it is intended that sturdy wedges of appropriately strong and tough materials can be inserted during the laying process to maintain continuous support to all sides of the tubular sections at or adjacent to the extreme wraps. Alternatively, a material, such as a grout, an epoxy, or a resin-based short-fiber composite can be injected to fill the gaps such that when the injected material cures, it will fully support the tubular sections at these locations during service.

Cube-Shaped ISO Container

Figure 13A:
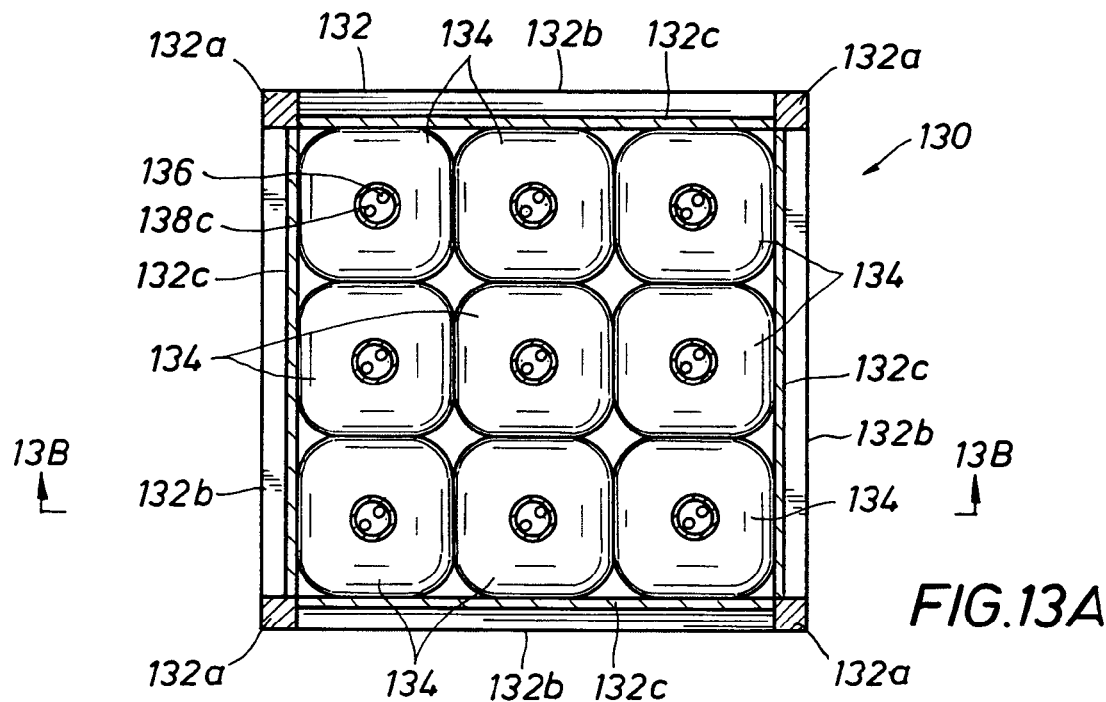
FIG. 13a is a plan view in cross-section of a cubic cargo container, according to the present invention.
Figure 13B:
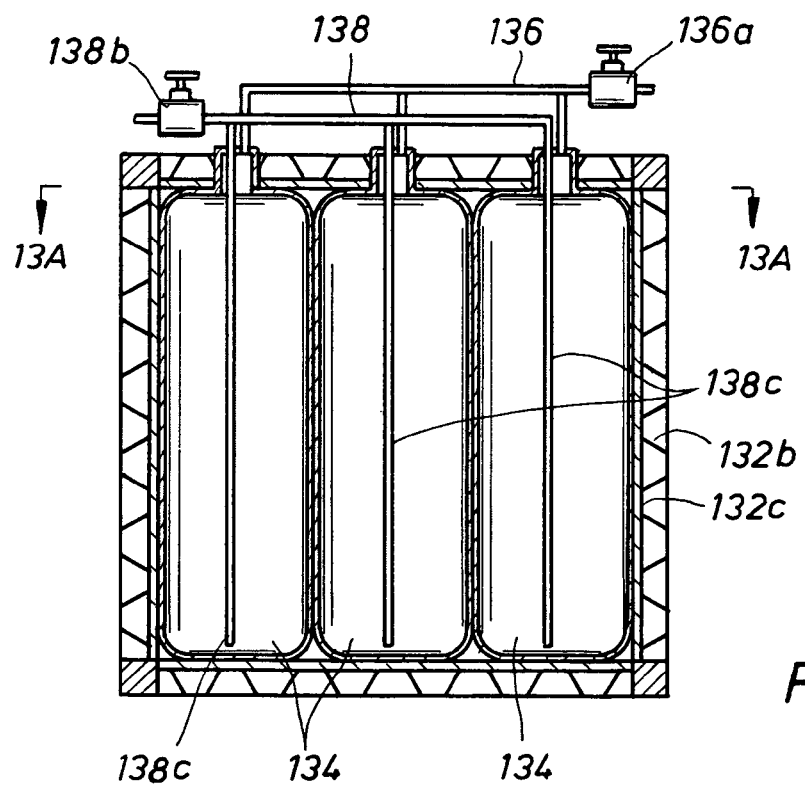

With reference to FIGS. 13a and 13b, another embodiment of the storage invention described herein is an ISO shipping container 130 that provides a convenient form of transportable storage. ISO shipping container 130 is typically an insulated cubic container structure 132 that preferably has standard external cross-section dimensions, such as about 8 ft by 8 ft by about 8 ft, which is about 2.44 m on a side. The sides of container structure 132 should be reinforced and insulated as necessary to provide adequate structural support and thermal insulation. FIG. 13a is a top plan view of container structure 132 in partial cross-section with the top of container structure 132 removed to show its interior. Nine tanks 134, each having a square cross-section according to the present invention, are secured with a vertical orientation within the interior of container structure 132. Alternatively, one or four or any desired number of tanks can be placed inside container structure 132.

FIG. 13b is a side elevation of container structure 132 in partial cross-section with the nearest side wall removed to show the interior of container structure 132. Tanks 134 stand upright within cubic container structure 132 and fluid communication is provided into, out of and between the nine tanks 134 by piping manifolds 136 and 138, which includes isolation and/or flow control valves 136a and 138a. Each tank 134 should have two fluid flow paths into and out of the tank, and a valve should be provided in each flow path. Preferably, all nine tanks 134 within cubic container structure 132 are manifolded together for isolation as a single unit, which can be isolated by valves 136a and 138a. Pressure relief valves should be provided on piping manifold 136 as necessary to comply with code requirements.

Internal risers or dip tubes 136c provide a vertical flow path within each tank 134 to allow drainage of dense fluids (e.g., liquids) from the bottom of each tank. It should be noted that the use of internal risers provides the ability to remove liquids from the bottoms of containers without the need for placing penetrations or nozzles and piping connections on their bottom sides.

Cube-shaped container structure 132 may comprise an external structural frame 132a along its corners and corrugated walls 132b, which would support internal insulation 132c that would contact the external surfaces of the outermost ring of tanks 134. Alternatively, structural foam core walls could be used that provide both the necessary structural capacity and thermal insulating property to complete the enclosure of the container cube.

Figure 14:
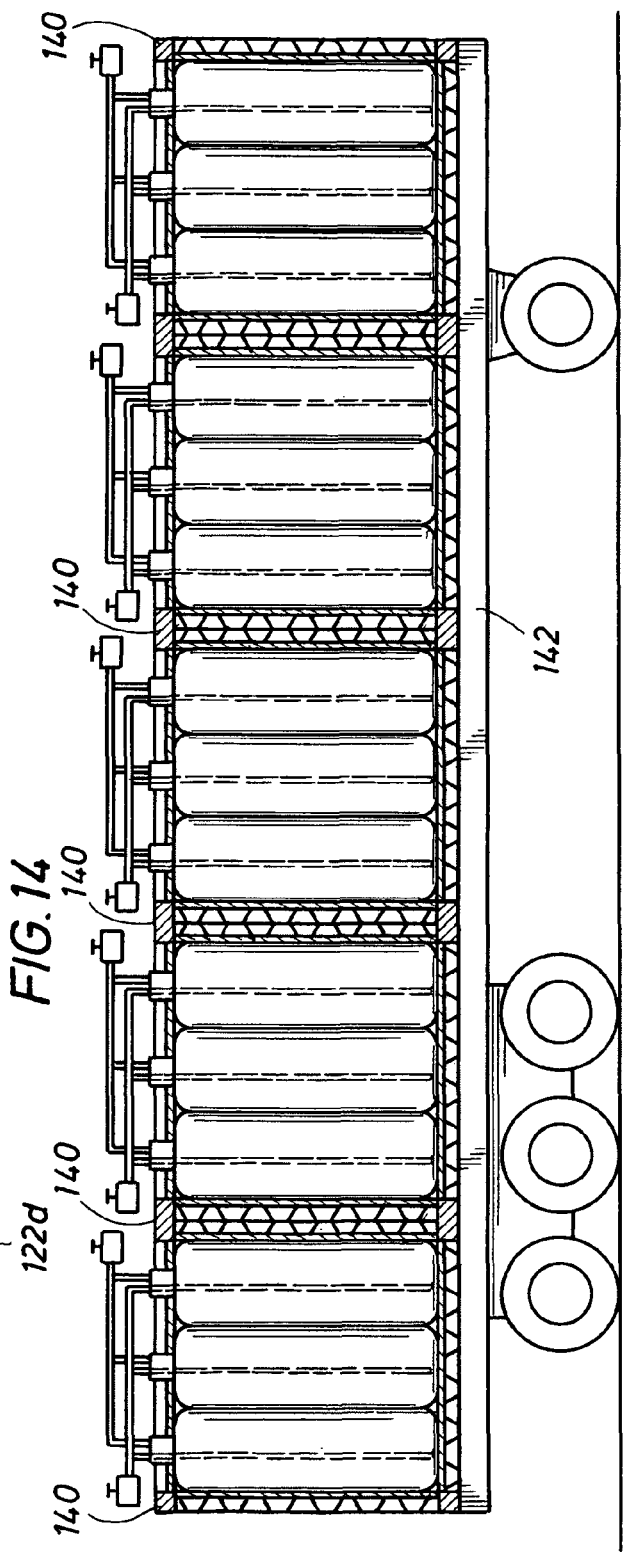
FIG. 14 is a side elevation in cross-section of five of the cubic cargo container of FIG. 13b operatively coupled together on a truck trailer for transport of a fluid cargo, according to the present invention.

FIG. 14 indicates how five cubic containers 140 can be combined to comprise the equivalent of a standard 40-ft long ISO container placed on a trailer 142 for highway transport. Temporary covers could be placed on top of each cubic container 140 or on the entire collection of containers on a trailer to limit the heat gain from the ambient environment or the sun.

Depending on the natural gas composition and storage conditions, it is possible that more than 14,000 scm (~500,000 scf) may be transported on a single road trailer. This is a large quantity compared to typical trailers outfitted for road transport of CNG stored at high pressure in steel cylinders. Further, those skilled in the art will recognize that multiples of these cubes and/or equivalent 40 ft long containers may be placed, secured and transported on railroad cars, barges, and/or boats.

While it is compelling to note that the aggregation of cubic containers on a truck provides a storage capacity for about twice as much gas as a typical CNG truck, it is even more compelling to compare the maritime example presented previously to a ship designed to transport CNG in rigid steel cylinders at ambient temperatures. In a paper by Valsgard et al (ref. "Compressed Natural Gas Carrier Development—The Knutsen PNG® Concept", Vol. 112, p. 271, Transactions of the 2004 Annual Meeting of the Society of Naval Architects and Marine Engineers, USA) and a presentation by Per Lothe of Knutsen OAS at the Zeus CNG Conference in Houston in June 2007 (published in the proceedings for the "Advancement in CNG-Marine Transport: The Final Approach to Commercialization", Jun. 26-28, 2007 by Zeus Development Corp. Houston, Tex., USA), Lothe's ocean-going natural gas shipping scheme is described as an ambient temperature concept using very high pressures of about 25 MPa to store and transport CNG on ships. Such a concept is representative of designs that would attempt to transport CNG at ambient temperature. In these references, it is noted that a ship about the size of the ship discussed in our maritime example would only carry about 1.7 to 2.0e6 scm of natural gas. This compares with the 7.1e6 scm that could be carried on board the 150 m ship in our maritime example. The advantages of the current invention can be highlighted by noting that a ship designed to carry 7.1e6 scm (i.e., about 5,500 metric tonnes) of Secord's Saharan gas using Lothe's ambient temperature, high pressure CNG concept for storage in thick-walled 42 inch diameter steel cylinders (of about 552 MPa yield strength) would have to carry over 1100 cylinders about 24.4 m long each. The ratio of the weight of the gas cargo to the weight of the containment system is about 0.21 for Lothe's high pressure concept while the gas/containment weight ratio in the maritime example using the current invention for squared low temperature tanks is about ten times higher (~2.0). So, even if the squared tanks cost 3 to 4 times as much per unit weight to procure/fabricate and install as the heavy walled rigid pipe cylinders, the containment cost could still be cut at least in half by using this invention. However, that is only part of the cost implications, because the ship must be designed to be big enough to carry the heavy high pressure CNG cylinders as well as providing external inspection access space around them. Considering that a ship based on the ambient temperature, high pressure CNG concept must carry about 27,000 metric tonnes of cylinders (as compared to a total of about 2,750 metric tonnes total for the 36 containers in our maritime example), such a ship will be at least twice as large as the ship presented in our maritime example. Therefore, the total cost of a ship of equal storage capacity designed according to the ambient temperature, high pressure CNG concept would be at least four times as costly when both containment and hull costs are included in the comparison.

The preceding text has described innovative forms of containment for natural gas storage and transport, as well as innovative means for loading to and discharging from stationary or transportable cargo containers. Having described the invention above, various modifications of the techniques, procedures, materials, and equipment will be apparent to those skilled in the art. It is intended that all such variations within the scope and spirit of the invention be included within the scope of the appended claims.

What is claimed is:

1. An apparatus for storage and/or transport of a fluid cargo, comprising:
   a container for holding the fluid cargo under pressure at a specified normal operating pressure that is at least 0.15 MPa greater than atmospheric pressure,
   the container having a pair of opposing heads and a wall section between the heads,
   the wall section defining a non-circular cross-section and comprising at least two adjacent and substantially planar sides joined together by a rounded corner,
   wherein the opposing heads and the wall section are formed into an integral unit that has an interior surface that defines an internal volume of the container and an exterior surface that defines an outermost surface of the container,
   wherein the sides are a single-layer and/or a multiple-layer membrane,
   wherein the sides have a wall thickness between the interior and exterior surfaces,
   wherein the sides are made of a material, and wherein the sides and the outermost surface of the container at the sides can expand outwardly by at least the amount of the wall thickness while the container contains the fluid cargo at a pressure that exceeds 10% of the specified normal operating pressure and while the container is not constrained by an external structure or by an external pressure that is greater than atmospheric pressure without exceeding the elastic limit of the material.

2. The apparatus of claim 1, wherein the container is sufficiently rigid to be self supporting when empty.

3. The apparatus of claim 2, wherein the container is adapted for a specified normal operating temperature below 0° C.

4. The apparatus of claim 3, wherein the container is adapted to hold the fluid cargo under pressure at a specified normal operating pressure that is at least 0.25 MPa greater than atmospheric pressure.

5. The apparatus of claim 1, wherein the fluid cargo is compressed natural gas, and wherein the container is adapted to hold the fluid cargo under pressure at a specified normal operating pressure that is at least 0.50 MPa greater than atmospheric pressure.

6. The apparatus of claim 5, wherein the non-circular cross-section of the wall section is a rectangle.

7. The apparatus of claim 6, wherein the container is adapted to allow the sides to expand outwardly by at least three times the amount of the wall thickness when the container contains the fluid cargo at the specified normal operating pressure.

8. The apparatus of claim 1, wherein the non-circular cross-section of the wall section is essentially a rectangle with four substantially planar sides joined together by four rounded corners, wherein each side has a length $L_S$ and each rounded corner has a radius of curvature $R_C$, and wherein the ratio $L_S/R_C$ is between about 2 and about 6.

9. The apparatus of claim 1, wherein the non-circular cross-section of the wall section is essentially a square with four substantially planar sides joined together by four rounded corners, wherein each side has a length $L_S$ and each rounded corner has a radius of curvature $R_C$, and wherein the ratio $L_S/R_C$ is between about 3 and about 4.

10. The apparatus of claim 8, wherein the container is adapted to hold the fluid cargo under pressure at a specified normal operating pressure that is at least 1.0 MPa greater than atmospheric pressure, and wherein the container is adapted for a specified normal operating temperature as low as about minus 160° C.

11. A system for storage and/or transport of a compressed gas, comprising:
   a plurality of containers designed to hold the compressed gas at a specified operating pressure of at least about 0.25 MPa above atmospheric pressure, each container having opposing end caps and a wall section disposed between the end caps, the wall section having a non-circular cross-section and comprising at least two adjacent and substantially planar sides joined together by a rounded corner, wherein the end caps and the wall section are formed into an integral unit having an interior surface that defines an interior space for receiving the compressed gas, wherein the sides have a wall thickness and are made of a material that is flexible and strong enough to expand outwardly the amount of the wall thickness without exceeding the elastic limit of the material when the pressure inside the container exceeds 10% of the specified operating pressure above atmospheric pressure without external support for the sides, wherein the sides require external support to avoid expanding to the point of exceeding the elastic limit of the material when the pressure inside the container is at about the specified operating pressure,
   wherein each container is located proximate to at least one other container so that at least a portion of the wall section of each container presses directly or indirectly against the wall section of at least one other container while filled with the compressed gas so that one side of a first container provides external support for one side of an adjacent second container; and a structural enclosure surrounding the plurality of containers, wherein the wall section of some portion of the containers press directly or indirectly against the structural enclosure whereby the structural enclosure provides external support for the containers, wherein the wall section of that portion of the containers that press against the structural enclosure would expand outwardly while under the specified operating pressure were it not for a counterforce provided by the structural enclosure.

12. The system of claim 11, wherein the structural enclosure comprises a land-based vehicle or a marine vessel adapted to receive the plurality of containers, said land-based vehicle or marine vessel having a plurality of internal support members, wherein the internal support members define one or more cargo holds, and wherein a portion of the internal support members provide external support for the wall section of that portion of the containers that press against the structural enclosure.

13. The system of claim 11, wherein the structural enclosure comprises an ISO container box, and wherein the containers have a substantially square cross-section and rounded corners.

14. The system of claim 11, wherein each side of each container receives external support from the structural enclosure and/or from a side of an adjacent container.

15. The system of claim 11, wherein the structural enclosure comprises an ISO container box, wherein the ISO container box has substantially the shape of a cube, wherein the containers have a substantially square cross-section and rounded corners, and wherein the rounded corners do not have and do not require external support.

16. A marine vessel for storing and/or transporting a compressed fluid, comprising:
    a hull having a bow, a stern and opposing vessel-sides connecting the bow to the stern;
    one or more longitudinal support vessel-walls extending between the bow and the stern;
    one or more transverse support vessel-walls extending between the vessel-sides,
    wherein a plurality of cargo holds is defined by the vessel-sides, the one or more longitudinal support vessel-walls, and the one or more transverse support vessel-walls; and
    at least one apparatus according to claim 1 received in each cargo hold for holding the compressed fluid,
    wherein the wall section of the apparatus is supported externally by the vessel-sides, the one or more longitudinal support vessel-walls, and/or the one or more transverse support vessel-walls to limit outward movement of the wall section of the container.

17. The marine vessel of claim 16, wherein at least two containers are received in one cargo hold, and wherein a portion of the wall sections of said at least two containers rest against each other for support.

18. The marine vessel of claim 16, wherein the container is sufficiently rigid to be self supporting when empty.

19. The marine vessel of claim 18, wherein the wall section of each container includes at least four relatively straight sidewall panels joined by rounded corners.

20. The marine vessel of claim 19, wherein said at least one apparatus is adapted to hold compressed natural gas at a temperature of less than about minus 10° C. and at a specified normal operating pressure of at least about 0.75 MPa greater than atmospheric pressure, and wherein the pressure of the compressed natural gas provides a pressure force that tends to move the sidewall panels of the wall section of the apparatus outward and the vessel-sides, the one or more longitudinal support vessel-walls, and/or the one or more transverse support vessel-walls provide a force that restricts outward movement of the sidewall panels of the wall section of the apparatus.

21. An apparatus for storing and/or transporting a compressed fluid, the apparatus comprising:
    a frame comprising a plurality of support members, wherein a portion of the plurality of support members define a void space; and
    a tank received in the void space, wherein the tank comprises:
        a pair of opposing heads and a wall section between the heads, wherein the opposing heads and the wall section are formed into an integral unit that has an interior surface that defines an internal volume of the tank and an exterior surface that defines an outermost surface of the tank,
        wherein the wall section comprises four substantially planar sides joined together by four rounded corners,
        wherein the sides have a wall thickness and are made of a material that is flexible and strong enough to allow a center span outward deflection of the sides of at least one wall thickness without exceeding the elastic limit of the material when the pressure inside the tank exceeds 10% of the specified operating pressure without external support for the sides,
        wherein the sides require external support to avoid expanding outwardly to a point of exceeding the elastic limit of the material when the pressure inside the tank is at about the specified operating pressure,
        wherein the rounded corners do not require external support when the pressure inside the tank is at about the specified operating pressure, and
        wherein the tank is sufficiently rigid to be self supporting when empty
    wherein a portion of the wall section rests against one or more support members in said portion of the plurality of support members that define the void space,
    wherein said one or more support members provide external support to said portion of the wall section of the tank that rests against said one or more support members for limiting outward expansion of said portion of the wall section, and
    wherein the frame is designed for holding the tank when the compressed fluid is in the interior space of the tank at a specified normal operating pressure of at least 0.15 MPa greater than atmospheric pressure and preventing the sides from expanding outwardly to an extent that would exceed the elastic limits of the material.

22. The apparatus of claim 21, wherein the specified normal operating pressure is at least 0.25 MPa greater than atmospheric pressure, and wherein the apparatus comprises a marine vessel, a land-based vehicle or a storage container.

23. The apparatus of claim 21, wherein the frame is adapted to be joined to an adjacent and essentially identical frame to create a standard-sized ISO shipping container.

24. The apparatus of claim 21, wherein each side has a length $L_S$ and each rounded corner has a radius of curvature $R_C$, and wherein the ratio $L_S/R_C$ is between about 2 and about 6.

25. The apparatus of claim 24, wherein the ratio $L_S/R_C$ is between about 3 and about 4.

26. The apparatus of claim 25, wherein the specified normal operating pressure is at least 0.50 MPa greater than atmospheric pressure, wherein the void space in the frame is defined by frame walls, and wherein the support members lie within the frame walls, further comprising insulation around the tanks.

27. A method for storing and/or transporting a fluid, comprising the steps of:
providing a support structure;
providing an apparatus according to claim 1, wherein the wall section has a wall portion that has an outer surface; and
locating the apparatus adjacent to the support structure so that the support structure is adjacent to the outer surface of the wall portion, wherein the wall portion rests against the support structure while the container is filled with the fluid and operating at a pressure of at least about 0.15 MPa above atmospheric pressure, and
wherein the support structure provides a counter-force to a force caused by the pressure of the fluid acting to expand the wall portion of the wall section of the apparatus.

28. The method of claim 27, wherein the support structure is part of a marine vessel.

29. The method of claim 27, wherein the support structure is part of a railroad car or part of a truck.

30. The method of claim 27, wherein the support structure comprises a concrete-lined hole in the earth.

31. The method of claim 27, wherein the fluid is compressed natural gas having a temperature between about minus 160° C. and about 30° C. and a pressure greater than about 1 MPa above atmospheric pressure.

32. The method of claim 27, wherein the fluid comprises a hydrate.

33. A method for storing and/or transporting compressed natural gas with a marine vessel or with a land-based vehicle, each of the marine vessel and the land-based vehicle having a cargo support structure that defines a cargo hold, the method comprising the steps of:
providing an apparatus according to claim 1;
locating the apparatus within the cargo hold such that a portion of the wall section is adjacent to a portion of the cargo support structure; and
loading compressed natural gas into the container, wherein the compressed natural gas is at a pressure at least about 1 MPa greater than atmospheric pressure, the pressure of the compressed natural gas providing an outward pressure force on the wall section,
wherein said portion of the cargo support structure provides a reactive force to limit outward movement of said portion of the wall section of the apparatus, and
wherein said portion of the wall section of the apparatus would move outwardly due to the pressure force of the compressed natural gas were it not supported by the support structure.

34. The method of claim 33, further comprising:
providing a tank for holding compressed natural gas, the tank having a pair of end caps and a wall section between the end caps, the wall section having a rectangular cross-section with four rounded corners and substantially planar sidewall panels between the rounded corners;
locating the tank in the cargo hold adjacent to the apparatus such that a portion of the wall section of the tank is adjacent to a second portion of the wall section of the apparatus; and
loading said compressed natural gas into the tank, the pressure of said compressed natural gas providing an outward pressure force on the wall section of the tank,
wherein said second portion of the wall section of the apparatus provides a reactive force to limit outward movement of said portion of the wall section of the tank, and
wherein said portion of the wall section of the tank would move outwardly due to the pressure force of the compressed natural gas were it not supported by said second portion of the wall section of the apparatus.

35. The method of claim 34, wherein the apparatus and the tank are each a pressure vessel that is sufficiently rigid to be self-supporting while empty and outside of the cargo hold.

36. The method of claim 35, wherein each cargo hold contains more than two pressure vessels, wherein the wall section of each pressure vessel is supported externally by either or both of an adjacent pressure vessel or the cargo support structure.

37. The method of claim 36, wherein the wall section of the apparatus and the tank each comprise four substantially planar sides joined together by four rounded corners, wherein each side has a length $L_S$ and each rounded corner has a radius of curvature $R_C$, and wherein the ratio $L_S/R_C$ is between about 2 and about 5.

38. The method of claim 37, further comprising applying a compressive pre-stress to the wall section of the tank longitudinally between the end caps so that the ratio $L_S/R_C$ can be greater than about 6.

39. A method for storing a compressed fluid in the earth, comprising:
providing a hole in the earth, the hole being defined by an inside wall;
installing an apparatus according to claim 1 in the hole, wherein the outermost surface of the container is adjacent to the inside wall that defines the hole in the earth;
filling the container with the compressed fluid to a specified normal operating pressure that is at least about 1 MPa above atmospheric pressure; and
allowing the wall section of the container to expand outwardly at least an amount equal to the wall thickness due to the pressure force of the compressed fluid until the wall section expands no further due to forces within the wall section and/or due to a reactive force exerted by the earth.

40. A tank for holding a compressed gas at a specified operating pressure of at least 0.25 MPa above atmospheric pressure at a specified normal operating temperature below 0° C., comprising:
a pair of opposing heads and a wall section between the heads, wherein the opposing heads and the wall section are formed into an integral unit that has an interior surface that defines an internal volume of the tank and an exterior surface that defines an outermost surface of the tank,
wherein the wall section comprises four substantially planar sides joined together by four rounded corners,
wherein the sides have a wall thickness and are made of a material that is flexible and strong enough to allow a center span outward deflection of the sides of at least one wall thickness without exceeding the elastic limit of the material when the pressure inside the tank exceeds 10% of the specified operating pressure without external support for the sides,
wherein the sides require external support to avoid expanding outwardly to a point of exceeding the elastic limit of the material when the pressure inside the tank is at about the specified operating pressure, wherein the rounded corners do not require external support when the pressure inside the tank is at about the specified operating pressure, and wherein the tank is sufficiently rigid to be self supporting when empty.

41. An apparatus for storage and/or transport of a compressed gas, comprising:

a plurality of the tanks defined in claim 40; and a structural enclosure surrounding the plurality of tanks, wherein a side of some or all of the tanks presses directly or indirectly against the structural enclosure, wherein the structural enclosure provides external support for said sides, and wherein each tank is adjacent to another tank such that at least one side of each tank presses directly or indirectly against one side of another tank.

42. The apparatus of claim 41, wherein the structural enclosure comprises an ISO container box.

43. An ISO shipping container, comprising at least two of the apparatus of claim 41 joined together.

* * * * *